(12) United States Patent
Amundson et al.

(10) Patent No.: US 9,471,069 B2
(45) Date of Patent: Oct. 18, 2016

(54) CONFIGURABLE THERMOSTAT FOR CONTROLLING HVAC SYSTEM

(71) Applicant: Honeywell International Inc., Morristown, NJ (US)

(72) Inventors: John B. Amundson, Minneapolis, MN (US); Heidi J. Finch, Champlin, MN (US); Brent D. Vick, Minnetonka, MN (US)

(73) Assignee: Honeywell International Inc, Morris Plains, NJ (US)

(*) Notice: Subject to any disclaimer, the term of this patent is extended or adjusted under 35 U.S.C. 154(b) by 0 days.

(21) Appl. No.: 14/671,964

(22) Filed: Mar. 27, 2015

(65) Prior Publication Data

US 2015/0205310 A1 Jul. 23, 2015

Related U.S. Application Data

(63) Continuation of application No. 14/556,592, filed on Dec. 1, 2014, which is a continuation of application No. 13/413,604, filed on Mar. 6, 2012, now Pat. No. 8,903,552, which is a continuation of application No. 12/700,672, filed on Feb. 4, 2010, now Pat. No. 8,219,251, which is a continuation of application No. 12/424,931, filed on Apr. 16, 2009, now Pat. No. 8,170,720, which is a continuation of application No. 11/421,833, filed on Jun. 2, 2006, now Pat. No. 7,634,504, which is a continuation-in-part of application No. 10/726,245, filed on Dec. 2, 2003, now Pat. No. 7,181,317.

(51) Int. Cl.
| | |
|---|---|
| G05D 23/19 | (2006.01) |
| G06F 3/0481 | (2013.01) |
| G05B 19/042 | (2006.01) |
| F24F 11/00 | (2006.01) |

(52) U.S. Cl.
CPC ....... *G05D 23/1917* (2013.01); *F24F 11/0009* (2013.01); *G05B 19/0426* (2013.01); *G05D 23/1904* (2013.01); *G06F 3/04817* (2013.01); *G05B 2219/2614* (2013.01); *Y10S 707/99942* (2013.01); *Y10S 707/99943* (2013.01); *Y10S 707/99944* (2013.01); *Y10S 707/99945* (2013.01); *Y10S 707/99948* (2013.01)

(58) Field of Classification Search
None
See application file for complete search history.

(56) References Cited

U.S. PATENT DOCUMENTS

| 3,656,112 A | 4/1972 | Paull |
| 3,900,842 A | 8/1975 | Calabro et al. |

(Continued)

FOREIGN PATENT DOCUMENTS

| DE | 3334117 A1 | 4/1985 |
| DE | 29600654 | 4/1996 |

(Continued)

OTHER PUBLICATIONS

Honeywell, "Electromechanical Thermostats," 2 pages, 2002.

(Continued)

*Primary Examiner* — Sean Shechtman
*Assistant Examiner* — Steven Garland
(74) *Attorney, Agent, or Firm* — Seager, Tufte & Wickhem LLP

(57) ABSTRACT

A thermostat including a controller operates to provide a guided programming sequence of two or more screens to a display. The guided sequence of screens prompts the user to provide system configuration information for updating the system configuration and providing a system summary screen.

23 Claims, 34 Drawing Sheets

(56) References Cited

U.S. PATENT DOCUMENTS

| | | |
|---|---|---|
| 4,079,366 A | 3/1978 | Wong |
| 4,174,807 A | 11/1979 | Smith et al. |
| 4,206,872 A | 6/1980 | Levine |
| 4,224,615 A | 9/1980 | Penz |
| 4,264,034 A | 4/1981 | Hyltin et al. |
| 4,296,334 A | 10/1981 | Wong |
| 4,298,946 A | 11/1981 | Hartsell et al. |
| 4,308,991 A | 1/1982 | Peinetti et al. |
| 4,314,665 A | 2/1982 | Levine |
| 4,332,352 A | 6/1982 | Jaeger |
| 4,337,822 A | 7/1982 | Hyltin et al. |
| 4,337,893 A | 7/1982 | Flanders et al. |
| 4,357,665 A | 11/1982 | Korff |
| 4,373,664 A | 2/1983 | Barker et al. |
| 4,379,483 A | 4/1983 | Farley |
| 4,382,544 A | 5/1983 | Stewart |
| 4,386,649 A | 6/1983 | Hines et al. |
| 4,388,692 A | 6/1983 | Jones et al. |
| 4,399,510 A | 8/1983 | Hicks |
| 4,401,262 A | 8/1983 | Adams et al. |
| 4,429,299 A | 1/1984 | Kabat et al. |
| 4,431,134 A | 2/1984 | Hendricks et al. |
| 4,442,972 A | 4/1984 | Sahay et al. |
| 4,446,913 A | 5/1984 | Krocker |
| 4,479,604 A | 10/1984 | Didner |
| 4,506,827 A | 3/1985 | Jamieson et al. |
| 4,510,398 A | 4/1985 | Culp et al. |
| 4,511,979 A | 4/1985 | Amirante |
| 4,551,812 A | 11/1985 | Gurr et al. |
| 4,556,169 A | 12/1985 | Zervos |
| 4,556,865 A | 12/1985 | Fukagawa et al. |
| 4,591,988 A | 5/1986 | Klima et al. |
| 4,606,401 A | 8/1986 | Levine et al. |
| 4,608,560 A | 8/1986 | Allgood |
| 4,621,336 A | 11/1986 | Brown |
| 4,622,544 A | 11/1986 | Bially et al. |
| 4,628,201 A | 12/1986 | Schmitt |
| 4,630,670 A | 12/1986 | Wellman et al. |
| 4,642,607 A | 2/1987 | Strom et al. |
| 4,646,964 A | 3/1987 | Parker et al. |
| 4,656,835 A | 4/1987 | Kidder et al. |
| 4,657,179 A | 4/1987 | Aggers et al. |
| 4,717,333 A | 1/1988 | Carignan |
| 4,725,001 A | 2/1988 | Carney et al. |
| 4,742,475 A | 5/1988 | Kaiser et al. |
| 4,771,185 A | 9/1988 | Feron et al. |
| 4,819,714 A | 4/1989 | Otsuka et al. |
| 4,837,731 A | 6/1989 | Levine et al. |
| 4,881,686 A | 11/1989 | Mehta |
| 4,909,041 A | 3/1990 | Jones |
| 4,914,568 A | 4/1990 | Kodosky et al. |
| 4,916,328 A | 4/1990 | Culp, III |
| 4,918,439 A | 4/1990 | Wozniak et al. |
| 4,924,404 A | 5/1990 | Reinke, Jr. |
| 4,948,040 A | 8/1990 | Kobayashi et al. |
| 4,992,779 A | 2/1991 | Sugino et al. |
| 4,997,029 A | 3/1991 | Otsuka et al. |
| 5,003,457 A | 3/1991 | Ikei et al. |
| 5,005,365 A | 4/1991 | Lynch |
| 5,012,973 A | 5/1991 | Dick et al. |
| 5,038,851 A | 8/1991 | Mehta |
| 5,053,752 A | 10/1991 | Epstein et al. |
| 5,065,813 A | 11/1991 | Berkeley et al. |
| 5,086,385 A | 2/1992 | Launey et al. |
| 5,088,645 A | 2/1992 | Bell |
| 5,140,310 A | 8/1992 | DeLuca et al. |
| 5,153,837 A | 10/1992 | Shaffer et al. |
| 5,161,606 A | 11/1992 | Berkeley et al. |
| 5,170,935 A | 12/1992 | Federspiel et al. |
| 5,172,565 A | 12/1992 | Wruck et al. |
| 5,181,653 A | 1/1993 | Foster et al. |
| 5,187,797 A | 2/1993 | Nielsen et al. |
| 5,230,482 A | 7/1993 | Ratz et al. |
| 5,238,184 A | 8/1993 | Adams |
| 5,251,813 A | 10/1993 | Kniepkamp |
| 5,259,445 A | 11/1993 | Pratt et al. |
| 5,270,952 A | 12/1993 | Adams et al. |
| 5,289,362 A | 2/1994 | Liebl et al. |
| 5,329,991 A | 7/1994 | Mehta et al. |
| 5,348,078 A | 9/1994 | Dushane et al. |
| 5,386,577 A | 1/1995 | Zenda |
| 5,392,042 A | 2/1995 | Pellon |
| 5,395,042 A | 3/1995 | Riley et al. |
| 5,404,934 A | 4/1995 | Carlson et al. |
| 5,482,209 A | 1/1996 | Cochran et al. |
| 5,526,422 A | 6/1996 | Keen |
| 5,537,106 A | 7/1996 | Mitsuhashi |
| 5,544,036 A | 8/1996 | Brown et al. |
| 5,566,879 A | 10/1996 | Longtin |
| 5,570,837 A | 11/1996 | Brown et al. |
| 5,644,173 A | 7/1997 | Elliason et al. |
| 5,673,850 A | 10/1997 | Uptegraph |
| 5,682,206 A | 10/1997 | Wehmeyer et al. |
| 5,706,191 A | 1/1998 | Bassett et al. |
| 5,732,691 A | 3/1998 | Maiello et al. |
| 5,761,083 A | 6/1998 | Brown et al. |
| 5,782,296 A | 7/1998 | Mehta |
| 5,802,467 A | 9/1998 | Salazar et al. |
| 5,818,428 A | 10/1998 | Eisenbrandt et al. |
| 5,845,259 A | 12/1998 | West et al. |
| 5,873,519 A | 2/1999 | Beilfuss |
| 5,877,957 A | 3/1999 | Bennett |
| 5,886,697 A | 3/1999 | Naughton et al. |
| 5,901,183 A | 5/1999 | Garin et al. |
| 5,902,183 A | 5/1999 | D'Souza |
| 5,915,473 A | 6/1999 | Ganesh et al. |
| 5,937,942 A | 8/1999 | Bias et al. |
| 5,947,372 A | 9/1999 | Tiernan |
| 5,950,709 A | 9/1999 | Krueger et al. |
| 5,982,445 A | 11/1999 | Eyer et al. |
| 6,020,881 A | 2/2000 | Naughton et al. |
| 6,032,867 A | 3/2000 | Dushane et al. |
| 6,059,195 A | 5/2000 | Adams et al. |
| 6,081,197 A | 6/2000 | Garrick et al. |
| 6,088,029 A | 7/2000 | Guiberson et al. |
| 6,098,893 A | 8/2000 | Berglund et al. |
| 6,101,824 A | 8/2000 | Meyer et al. |
| 6,104,963 A | 8/2000 | Cebasek et al. |
| 6,119,125 A | 9/2000 | Gloudeman et al. |
| 6,121,875 A | 9/2000 | Hamm et al. |
| 6,140,987 A | 10/2000 | Stein et al. |
| 6,141,595 A | 10/2000 | Gloudeman et al. |
| 6,149,065 A | 11/2000 | White et al. |
| 6,154,681 A | 11/2000 | Drees et al. |
| 6,167,316 A | 12/2000 | Gloudeman et al. |
| 6,192,282 B1 | 2/2001 | Smith et al. |
| 6,196,467 B1 | 3/2001 | Dushane et al. |
| 6,208,331 B1 | 3/2001 | Singh et al. |
| 6,216,956 B1 | 4/2001 | Ehlers et al. |
| 6,236,326 B1 | 5/2001 | Murphy |
| 6,259,074 B1 | 7/2001 | Brunner et al. |
| 6,285,912 B1 | 9/2001 | Ellison et al. |
| 6,290,140 B1 | 9/2001 | Pesko et al. |
| 6,315,211 B1 | 11/2001 | Sartain et al. |
| 6,318,639 B1 | 11/2001 | Toth |
| 6,320,577 B1 | 11/2001 | Alexander |
| 6,330,806 B1 | 12/2001 | Beaverson et al. |
| 6,344,861 B1 | 2/2002 | Naughton et al. |
| 6,351,693 B1 | 2/2002 | Monie et al. |
| 6,398,118 B1 | 6/2002 | Rosen et al. |
| 6,453,687 B2 | 9/2002 | Sharood et al. |
| 6,466,132 B1 | 10/2002 | Caronna et al. |
| 6,478,233 B1 | 11/2002 | Shah |
| 6,483,906 B1 | 11/2002 | Iggulden et al. |
| 6,502,758 B2 | 1/2003 | Cottrell |
| 6,518,953 B1 | 2/2003 | Armstrong |
| 6,518,957 B1 | 2/2003 | Lehtinen et al. |
| 6,546,419 B1 | 4/2003 | Humpleman et al. |
| 6,556,899 B1 | 4/2003 | Harvey et al. |
| 6,578,770 B1 | 6/2003 | Rosen |
| 6,580,950 B1 | 6/2003 | Johnson et al. |
| 6,581,846 B1 | 6/2003 | Rosen |
| 6,595,430 B1 | 7/2003 | Shah |
| 6,608,560 B2 | 8/2003 | Abrams |

(56) References Cited

U.S. PATENT DOCUMENTS

| | | |
|---|---|---|
| 6,619,555 B2 | 9/2003 | Rosen |
| 6,621,507 B1 | 9/2003 | Shah |
| 6,726,112 B1 | 4/2004 | Ho |
| 6,783,079 B2 | 8/2004 | Carey et al. |
| 6,786,421 B2 | 9/2004 | Rosen |
| 6,789,739 B2 | 9/2004 | Rosen |
| 6,824,069 B2 | 11/2004 | Rosen |
| 6,833,990 B2 | 12/2004 | LaCroix et al. |
| 6,851,621 B1 | 2/2005 | Wacker et al. |
| 6,868,293 B1 | 3/2005 | Schurr et al. |
| 6,891,838 B1 | 5/2005 | Petite et al. |
| 6,967,565 B2 | 11/2005 | Lingemann |
| 6,975,958 B2 | 12/2005 | Bohrer et al. |
| 7,001,495 B2 | 2/2006 | Essalik et al. |
| 7,050,026 B1 | 5/2006 | Rosen |
| 7,146,253 B2 | 12/2006 | Hoog et al. |
| 7,152,806 B1 | 12/2006 | Rosen |
| 7,156,318 B1 | 1/2007 | Rosen |
| 7,181,317 B2 | 2/2007 | Amundson et al. |
| 7,240,289 B2 | 7/2007 | Naughton et al. |
| 7,246,087 B1 | 7/2007 | Ruppelt et al. |
| 7,302,642 B2 | 11/2007 | Smith et al. |
| 7,634,504 B2 | 12/2009 | Amundson |
| 7,942,387 B2 | 5/2011 | Forkosh |
| 8,170,720 B2 | 5/2012 | Amundson et al. |
| 8,219,251 B2 | 7/2012 | Amundson et al. |
| 8,606,409 B2 | 12/2013 | Amundson et al. |
| 2001/0029585 A1 | 10/2001 | Simon et al. |
| 2001/0042684 A1 | 11/2001 | Essalik et al. |
| 2001/0052459 A1 | 12/2001 | Essalik et al. |
| 2002/0005435 A1 | 1/2002 | Cottrell |
| 2002/0011923 A1 | 1/2002 | Cunningham et al. |
| 2002/0022991 A1 | 2/2002 | Sharood et al. |
| 2002/0060701 A1 | 5/2002 | Naughton et al. |
| 2002/0092779 A1 | 7/2002 | Essalik et al. |
| 2002/0096752 A1 | 7/2002 | Huang |
| 2002/0138184 A1 | 9/2002 | Kipersztok et al. |
| 2002/0173929 A1 | 11/2002 | Seigel |
| 2003/0014179 A1 | 1/2003 | Szukala et al. |
| 2003/0033156 A1 | 2/2003 | McCall |
| 2003/0033230 A1 | 2/2003 | McCall |
| 2003/0034897 A1 | 2/2003 | Shamoon et al. |
| 2003/0034898 A1 | 2/2003 | Shamoon et al. |
| 2003/0056946 A1 | 3/2003 | Breeden |
| 2003/0074489 A1 | 4/2003 | Steger et al. |
| 2003/0121652 A1 | 7/2003 | Carey et al. |
| 2003/0123224 A1 | 7/2003 | LaCroix et al. |
| 2003/0136135 A1 | 7/2003 | Kim et al. |
| 2003/0142121 A1 | 7/2003 | Rosen |
| 2003/0150926 A1 | 8/2003 | Rosen |
| 2003/0150927 A1 | 8/2003 | Rosen |
| 2003/0208282 A1 | 11/2003 | Shah |
| 2004/0074978 A1 | 4/2004 | Rosen |
| 2004/0193324 A1 | 9/2004 | Hoog et al. |
| 2004/0245352 A1 | 12/2004 | Smith |
| 2004/0262410 A1 | 12/2004 | Hull |
| 2007/0045441 A1 | 3/2007 | Ashworth et al. |
| 2012/0239203 A1 | 9/2012 | Amundson et al. |

FOREIGN PATENT DOCUMENTS

| | | |
|---|---|---|
| DE | 19840552 | 3/2000 |
| EP | 0070414 | 1/1983 |
| EP | 0332957 | 9/1989 |
| EP | 0434926 | 7/1991 |
| EP | 0978692 | 2/2000 |
| EP | 0678204 B1 | 3/2000 |
| EP | 0985994 | 3/2000 |
| EP | 1033641 | 9/2000 |
| EP | 1074009 | 2/2001 |
| FR | 2711230 | 4/1995 |
| SK | 20556 | 10/2001 |
| WO | 9711448 | 3/1997 |
| WO | WO 97/11448 | 3/1997 |
| WO | WO 97/39392 | 10/1997 |
| WO | 0043870 | 7/2000 |
| WO | WO 00/43870 | 7/2000 |
| WO | WO 01/52515 | 7/2001 |
| WO | WO 01/79952 | 10/2001 |
| WO | WO 01/93779 | 12/2001 |

OTHER PUBLICATIONS

MagicStat, "Electronic, Programmable Thermostat, Owner's Manual," 23 pages. 1986.
Honeywell, "Magic Stat Programming and Installation Instructions," 14 pages, 1993.
"A Full Range of Alternative User Interfaces for Building Occupants and Operators," http://www.automatedbuildings.com/news/jan00/articles/andover/andover.htm, 5 pages, dated Jan. 2000, printed Sep. 20, 2004.
"CorAccess Systems/In Home," http://web.archive.org/web20011212084427/www.coraccess.com/home.html, 1 page, copyright 2001, printed Aug. 19, 2004.
"HAI Company Background," http://www.homeauto.com/AboutHAI/abouthai_main.htm, 2 pages, printed Aug. 19, 2004.
"High-Tech Options Take Hold in New Homes-200-08-28-Dallas Business Journal," http://bizjournals.com/dallas/stories/2000/08/28/focus4, 3 pages, dated Aug. 28, 2008, printed Aug. 19, 2004.
"Home Toys Review-TouchLinc," http://www.hometoys.com/htinews/aug99/reviews/touchlinc.htm, 3 pages, dated Aug. 1999, printed Aug. 20, 2004.
"Mark of Excellence Award Finalist Announced," http://64.233.167.104/search?Q=cache:ciOA2YtYaBIJ:www.hometoys.com/releases/mar . . . , 6 pages, Leopard Touchscreen on p. 2, dated prior to Mar. 4, 2000, printed Aug. 20, 2004.
"Product Review-Philips Pronto Remote Control," http://hometheaterhifi.com/volume_6_2/philipsprontoremotecontrol.html, 5 pages, dated May 1999, printed Aug. 20, 2004.
"RC X10 Automation Forum: Control Your Heating and Cooling System with Pronto (1/1)," http://www.remotecentral.com/cgi-bin/mboard/rc-x10/thread.cgi?12, 2 pages, dated Apr. 23, 1999, printed Aug. 20, 2004.
"Spotlight on Integrated Systems," Custom Builder, V8, N2, p. 66(6), Mar.-Apr. 1993.
"Vantage Expands Controls for Audio/Video, HVAC and Security," http://www.Hometoys.com/htinews/aug99/realease/vantage03.htm, 2 pages, dated Aug. 3, 1999, printed Aug. 20, 2004.
Action Closing Prosection for Reexam Control No. 95/002,041, Mailed Jul. 5, 2013.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 5 pages, May 2001; First Sale Feb. 2001.
ADT Security Systems, "iCenter Advanced User Interface 8142ADT User Guide," pp. 1-136, 2001.
Aprilaire Electronic Thremostats Models 8344, 8346, 8348, 8363, 8365, 8366 Operating Instructions, 8 pages, prior to Dec. 2, 2003.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
AutomatedBuildings.com Article-"Thin Client" Solutions, "Pressure, Air Flow, Temperature, Humidity & Valves," Dwyer Instruments, Inc., 5 pages, printed Sep. 20, 2004.
Blake et al., "Seng 310 Final Project Demo Program," Illustration, 3 pages, Apr. 6, 2001.
Blake et al., "Seng 310 Final Project," Report, dated Apr. 6, 2001.
Blister Pack Insert from a Ritetemp 8082 Touch Screen Thermostat Product, 2 pages, 2002.
Braeburn Model 3000 Owner's Manual, pp. 1-13, 2001.
Braeburn Model 5000 Owner's Manual, pp. 1-17, 2001.
BRK Electronics Maximum Protection Plus Ultimate Convenience Smoke Alarm, 24 pages, prior to Dec. 2, 2003.
BRK First Alert, User's Manual, Smoke and Fire Alarms, pp. 1-7, Nov. 2002.

(56) References Cited

OTHER PUBLICATIONS

Bryant, "Installation and Start-Up Instructions Evolution Control SYSTXBBUID01," 12 pages, 2004.
Business Wire, "MicroTouch Specialty Products Group to Capitalize on Growing Market for Low-Cost Digital Matrix Touchscreens," pp. 1174 (2 pages), Jan. 6, 1999.
Cardio Manual, available at http://www.secant.ca/en/documentation/cardio2é-Manual.pdf, Cardio Home Automation Inc., 55 pages, printed Sep. 28, 2004.
Cardio, by Secant; http://www.hometoys.com/htinews/apr98/reviews/cardio.htm, "HTINews Review," Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to Dec. 2, 2003.
Carrier, "Programmable Dual Fuel Thermostat," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8, 1998.
Carrier, "Thermidistat Control," Installation, Start-Up, and Operating Instructions, pp. 1-12, Aug. 1999.
Climatouch, User Manual, Climatouch CT03TSB Thermostat, Climatouch CT03TSHB Thermostat with Humididty Control, Outdoor UHF Temperature Transmitter 217S31, 19 pages, Printed Sep. 15, 2004.
File History for ReExam Control No. 95/002,041, U.S. Pat. No. 7,634,504, ReExamination Filed Jul. 18, 2012.
CorAccess, "Companion 6," User Guide, pp. 1-20, Jun. 17, 2002.
Danfoss RT51/51 RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," pp. 188-189, 2002.
Domotique Secant Home Automation-Web Page, available at http://www.secant.ca/en/company/default.asp, 1 page, printed Sep. 28, 2004.
Firex Smoke Alarm, Ionization Models AD, ADC Photoelectric Model Pad, 4 pages, prior to Dec. 2, 2003.
Freudenthal et al., "Communicating Extensive Smart Home Functionality to Users of All Ages: The Design of a Mixed-Initiative Multimodal Thermostat-Interface," pp. 34-39, Mar. 12-13, 2001.
Gentex Corporation, 9000 Series, Photoelectric Type Single Station/Multi-Station Smoke Alarms AC Powered with Battery Backup, Installation Instructions-Owner's Information, pp. 9-1 to 9-6, Jan. 1, 1993.
Gentex Corporation, HD135, 135° Fixed Temperature Heat Detector AC Powered, 120V, 60Hz with Battery Backup, Installation Instructions-Owner's Information, pp. 1-5, Jun. 1, 1998.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostat, Installation Instructions, pp. 1-8, 2003.
Honeywell News Release, "Honeywell's New Sysnet Facilities Integration System for Boiler Plant and Combustion Safety Processes," 4 pages, Dec. 15, 1995.
Honeywell T8002 Programmable Thermostat, Installation Instructions, pp. 1-8, 2002.
Honeywell T8602 A, B, C, D and TS8602 A, C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Excel Building Supervisor-Integrated R7044 and FS90 Ver. 2.0," Operator Manual, 70 pages, Apr. 1995.
Honeywell, "Introduction of the S7350A Honeywell WebPAD Information Appliance," Home and Building Control Bulletin, 2 pages, Aug. 29, 2000; Picture of Web Pad Device with touch Screen, 1 page; and screen shots of WebPad Device, 4 pages.
Honeywell, "Vision Pro 8000 Touchscreen Programmable Thermostat," Honeywell International Inc., 40 pages, 2004.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://hometheaterhifi.com/volume_6 2/philipsprontoremotecontrol.html, 5 pages, dated May 1999. printed Aug. 20, 2004.
http://www.cc.gatech.edu/computing/classes/cs6751_94_fall/groupc/climate-2/nodel.html, "Contents," 53 pages, printed Sep. 20, 2004.
http://www.hometoys.com/htinews/apr99/releases/hal01.htm, HTI News Release, pp. 1-3, Apr. 1999.
http://www.ritetemp.info/rtMenu_13.html, RiteTemp 8082, 6 pages, printed Jun. 20, 2003.
http://www.thermostatsales.com, Robershaw, "9610 Digital Programmable Thermostat," 3 pages, printed Jun. 17, 2004.
http://www.thermostatsales.com, Robershaw, "9700 Digital Programmable Thermostat," 3 pages, printed Jun. 17, 2004.
http://www.thermostatsales.com, Robershaw, "9710 Digital Programmable Thermostat," 3 pages, printed Jun. 17, 2004.
http://www.thermostatsales.com, Robershaw, "9720 Digital Programmable Thermostat," 3 pages, printed Jun. 17, 2004.
Hunter, "44200/44250," Owner's Manual, 32 pages, printed prior to Dec. 2, 2003.
Hunter, "44300/44350," Owner's Manual, 35 pages, printed prior to Dec. 2, 2003.
Hunter, "Auto Saver 550," Owner's Manual Model 44550, 44 pages, printed prior to Dec. 2, 2003.
Install Guide for Ritetemp Thermostat 8082, 6 pages, 2002.
Invensys Deluxe Programmable Thermostats 9700, 9701, 9715, 9720, User's Manual, 21 pages, prior to Dec. 2, 2003.
Lennox, "Network Control Panel (NCP)," User's Manual, 18 pages, Nov. 1999.
Invensys™, "9700i 970 I i 9715i 9720i Deluxe Programmbale Thermostats," User's Manual, pp. 1-28, printed prior to Dec. 2, 2003.
Lux TX9000 Installation, 3 pages, prior to Dec. 2, 2003.
Lux, "511 Series Smart Temp Electronic Thermostat," Owner's Manual, 3 pages, printed prior to Dec. 2, 2003.
Lux, "600 Series Smart Temp Electronic Thermostat," Owner's Manual, 3 pages, printed prior to Dec. 2, 2003.
Lux, "602 Series Multi-Stage Programmable Thermostat," Owner's Manual, 3 pages, printed prior to Dec. 2, 2003.
Lux, "605/2110 Series Programmable Heat Pump Thermostat," Owner's Manual, 3 pages, printed prior to Dec. 2, 2003.
Lux, "700/9000 Series Smart Temp Electronic Thermostat," Owner's Manual, 3 pages, printed prior to Dec. 2, 2003.
Lux, "ELV1 Programmable Line Voltage Thermostat," Owner's Manual, 3 pages, printed prior to Dec. 2, 2003.
Lux, "PSPH521 Series Programmable Heat Pump Thermostat," Owner's Manual, 3 pages, printed prior to Dec. 2, 2003.
Lux, "TX1500 Series Smart Temp Electronic Thermostat," Owner's Manual, 6 pages, printed prior to Dec. 2, 2003.
Lux, "TX500 Series Smart Temp Electronic Thermostat," Owner's Manual, 3 pages, printed prior to Dec. 2, 2003.
Matty, "Advanced Energy Management for Home Use," IEEE Transactions on Consumer Electronics, vol. 35, No. 3, pp. 584-588, 1989.
Metasys, "HVAC PRO for Window's User's Manual," 308 pages, 1998.
Mounting Template for Ritetemp Thermostat 8082, 1 page, 2002.

(56) References Cited

OTHER PUBLICATIONS

Operation manual for Ritetemp Touch Screen Thermostat 8082, 8 pages, 2002.
Proliphix Inc., "Web Enabled IP Thermostats," 2 pages, prior to Dec. 2, 2003.
Quick Start Guide for Ritetemp Thermostat 8082, 1 page, 2002.
Raji, "Smart Networks for Control," IEEE Spectrum, pp. 49-55, 1994.
Remote Control Power Requirement for Ritetemp Thermostat 8082, 1 page, 2002.
Ritetemp Operation 8029, 3 pages, Jun. 19, 2002.
Ritetemp Operation 8050, 5 pages, Jun. 26, 2002.
Ritetemp Operation 8085, pp. 1-6, prior to Dec. 2, 2003.
Sealed Unit Parts Co., Inc., Supco & CTC Thermostats . . . Loaded with Features, Designed for Value!, 6 pages, prior to Dec. 2, 2003.
Totaline Model P474-1035 Owner's Manual Programmable 5-2 Day Digital Thermostat, pp. 1-21, prior to Dec. 2, 2003.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Dec. 2, 2003.
Totaline, "1 for All Programmable Digital Thermostat," Owner's Manual P/N P374-1100FM, 23 pages, Nov. 1998.
Totaline, "1 for All Programmable Digital Thermostat," Owner's Manual P/N P474-1050, 21 pages, Nov. 1998.
Totaline, "1 For All Programmable Digital Thermostat," Owner's Manual P/N P374-1100, 24 pages, Apr. 2001.
Totaline, "Instructions P/N P474-1010," Manual, 2 pages, Dec. 1998.
Totaline, "Intellistat Combination Temperature and Humidity Control," Owner's Manual P/N P374-1600, 25 pages, Jun. 2001.
Totaline, "Programmable Thermostat Configurable for Advanced Heat Pump or Dual Fuel Operation," Owner's Manual P/N P374-1500, 24 pages, Jun. 1999.
Totaline, "Programmable Thermostat," Homeowner's Guide, 27 pages, Dec. 1998.
Totaline, "Wireless Programmable Digital Thermostat," Owner's Manual 474-1100RF, 21 pages, 2000.
Trane, "System Programming, Tracer Summit Version 14, BMTW-SVP01D-EN," 623 pages, 2002.
Trouble Shooting Guide for Ritetemp Thermostat 8082, 1 page, 2002.
Visor Handheld User Guide, Copyright 1999-2000.
Warmly Yours, "Model TH111GFCI-P (120 VAC)," Manual, pp. 1-4, printed prior to Dec. 2, 2003.
White-Rodgers 1F80-224 Programmable Electronic Digital Thermostat, Installation and Operation Instructions, 8 pages, prior to Dec. 2, 2003.
White-Rodgers Installation Instructions for Heating & Air Conditioning IF78 Non-Programmable Thermostat, 6 pages, prior to Dec. 2, 2003.
White-Rodgers, "Comfort-Set 90 Series Thermostat," Manual, pp. 1-44, printed prior to Dec. 2, 2003.
White-Rodgers, "Comfort-Set III Thermostat," Manual, pp. 1-44, printed prior to Dec. 2, 2003.
White-Rodgers, "Installation Instructions for Heating & Air Conditioning IF72 5/2 Day Programmable Heat Pump Thermostat," 8 pages, printed prior to Dec. 2, 2003.
White-Rodgers, "Installation Instructions for Heating & Air Conditioning IF78 5/2 Day Programmable Thermostat," 7 pages, printed prior to Dec. 2, 2003.
White-Rodgers, Comfort-Set 90 Series Premium, 4 pages, prior to Dec. 2, 2003.
White-Rodgers, IF80-240 "(for Heating Only systems) Programmable Electronic Digital Thermostat," Installation and Operation Instructions, 8 pages, printed prior to Dec. 2, 2003.
White-Rodgers, IF80-241, "Programmable Electronic Digital Thermostat," Installation and Operation Instructions, 6 pages, printed prior to Apr. 16, 2009.
White-Rodgers, IF80-261, "Programmable Electronic Digital Thermostat," Installation and Operation Instructions, 8 pages, printed prior to Dec. 2, 2003.
White-Rodgers, IF81-261, "Programmable Electronic Digital Multi-Stage Thermostat," Installation and Operation Instructions, 8 pages, printed prior to Dec. 2, 2003.
White-Rodgers, IF82-261, "Programmable Electronic Digital Heat Pump Thermostat," Installation and Operation Instructions, 8 pages, prior to Dec. 2, 2003.
www.icmcontrols.com, Simplecomfort, SC3000 Single Stage Heat/Single Stage Cool or Single Stage Heat Pump/Manual Changeover, 1 page, printed prior to Dec. 2, 2003.
www.icmcontrols.com, Simplecomfort, SC3001 Single Stage Heat/Single Stage Cool or Single Stage Heat Pump/Manual Changeover, 1 page, printed prior to Dec. 2, 2003.
www.icmcontrols.com, Simplecomfort, SC3006 Single Stage Heat/Single Stage Cool or Single Stage Heat Pump/Manual Changeover, 1 page, printed prior to Dec. 2, 2003.
www.icmcontrols.com, Simplecomfort, SC3201 2 Stage Heat Pump Manual Changeover, 1 page, printed prior to Dec. 2, 2003.
www.icmcontrols.com, Simplecomfort, SC3801 2 Stage Heat/2 Stage Cool 2 Stage Heat Pump/Audio Changeover, 1 page, printed Dec. 2, 2003.

CONFIGURABLE THERMOSTAT FOR CONTROLLING HVAC SYSTEM

PRIORITY STATEMENT

This is a continuation application of U.S. patent application Ser. No. 14/556,592, entitled "Interview Programming For an HVAC Controller", filed Dec. 1, 2014, which is a continuation of U.S. patent application Ser. No. 13/413,604, entitled "Interview Programming For an HVAC Controller", filed Mar. 6, 2012, now U.S. Pat. No. 8,903,552, which is a continuation of U.S. patent application Ser. No. 12/700,672, entitled "Interview Programming For an HVAC Controller", filed Feb. 4, 2010, now U.S. Pat. No. 8,219,251, which is a continuation of U.S. patent application Ser. No. 12/424,931, entitled "HVAC Controller With Guided Schedule Programming", filed Apr. 16, 2009, now U.S. Pat. No. 8,170,720, which is a continuation of U.S. patent application Ser. No. 11/421,833, entitled "Natural Language Installer Setup For Controller", filed Jun. 2, 2006, now U.S. Pat. No. 7,634,504 which is a continuation-in-part of U.S. patent application Ser. No. 10/726,245, entitled "Controller Interface With Interview Programming", filed on Dec. 2, 2003, now U.S. Pat. No. 7,181,317.

FIELD

The present invention relates generally to the field of programmable controllers for homes and/or buildings and their related grounds. More specifically, the present invention relates to simplified interfaces for such controllers having interview programming capabilities.

BACKGROUND

Controllers are used on a wide variety of devices and systems for controlling various functions in homes and/or buildings and their related grounds. Some controllers have schedule programming that modifies device parameter set points as a function of date and/or time. Some such device or system controllers that utilize schedule programming for controlling various functions in homes and/or buildings and their related grounds include, for example, HVAC controllers, water heater controllers, water softener controllers, security system controllers, lawn sprinkler controllers, and lighting system controllers.

HVAC controllers, for example, are employed to monitor and, if necessary, control various environmental conditions within a home, office, or other enclosed space. Such devices are useful, for example, in regulating any number of environmental conditions with a particular space including for example, temperature, humidity, venting, air quality, etc. The controller may include a microprocessor that interacts with other components in the system. For example, in many modern thermostats for use in the home, a controller unit equipped with temperature and humidity sensing capabilities may be provided to interact with a heater, blower, flue vent, air compressor, humidifier and/or other components, to control the temperature and humidity levels at various locations within the home. A sensor located within the controller unit and/or one or more remote sensors may be employed to sense when the temperature or humidity reaches a certain threshold level, causing the controller unit to send a signal to activate or deactivate one or more components in the system.

The controller may be equipped with an interface that allows the user to monitor and adjust the environmental conditions at one or more locations within the building. With more modern designs, the interface typically includes a liquid crystal display (LCD) panel inset within a housing that contains the microprocessor as well as other components of the controller. In some designs, the interface may permit the user to program the controller to activate on a certain schedule determined by the user. For example, the interface may include a separate menu routine that permits the user to change the temperature at one or more times during a particular day. Once the settings for that day have been programmed, the user can then repeat the process to change the settings for the other remaining days.

With more modern designs, the programmable controller may include a feature that allows the user to set a separate schedule for weekday and weekend use, or to copy the settings for a particular day and then apply them towards other selected days of the week. While these designs allow the user to copy settings from one day to another, a number of steps are often required to establish a program, adding to the complexity of the interface. In some cases, the interface may not permit the user to select multiple days outside of the normal weekday/weekend scheme. In other cases, the interface is simply too complex to be conveniently used to program a temperature scheme and is simply by-passed or not programmed by the user. Accordingly, there is an ongoing need in the art to decrease the time and complexity associated with programming a multi-day schedule in a programmable controller.

During the installation process, the steps required to program the controller to operate with other system components can also add to the time and complexity associated with configuring the controller. Typically, programming of the controller is accomplished by entering in numeric codes via a fixed segment user interface, by manually setting jumper switches on a circuit board, or by adjusting screws or potentiometers on a circuit board. In some cases, the codes or settings used to program the controller are obtained from a manual or table which must be consulted by the installer during the installation process. For example, to configure an HVAC system having a multistage heat pump, the controller may require the installer to enter a numeric or alphanumeric code (e.g. 91199) from a manual or table in order to program the controller to properly operate the various stages of the heat pump. Such process of referring to a manual or table of codes is not often intuitive to the user, and requires the user to store the manual in a safe place for subsequent use. Accordingly, there is also an ongoing need in the art to decrease the time and complexity associated with programming the controller during the installation process.

SUMMARY

Generally, the present invention pertains to simplified interfaces for controllers having interview programming capabilities.

In one illustrative embodiment, a method of programming a schedule of a controller having a user interface is described. The illustrative method includes the steps of providing one or more interview questions to a user via the user interface; accepting one or more user responses to the one or more interview questions from the user via the user interface; and creating and/or modifying or building a schedule based on the user responses.

In another illustrative embodiment, a method of programming configuration information within a controller is further described. An illustrative method can include the steps of providing one or more interview questions to a user via a user interface, prompting the user to selected between at least two answers simultaneously displayed on the user interface, accepting one or more user responses to the interview questions via the user interface, and modifying the operational parameters of the controller and/or one or more components controlled by the controlled based at least in part on the user responses. The interview questions can include at least one question relating to the installation or setup of the controller as well as any components controlled by the controller.

An illustrative controller having interview programming capabilities can include an interview question generator adapted to generate a number of interview questions relating to the installation or setup of the controller and/or any components controlled by the controller, a user interface including a display screen adapted to display interview questions to a user along with at least two answers for each interview question, and a memory unit for storing operational parameters within the controller based at least in part on the user responses to the interview questions.

The above summary of the present invention is not intended to describe each disclosed embodiment or every implementation of the present invention. The Figures, Detailed Description and Examples which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
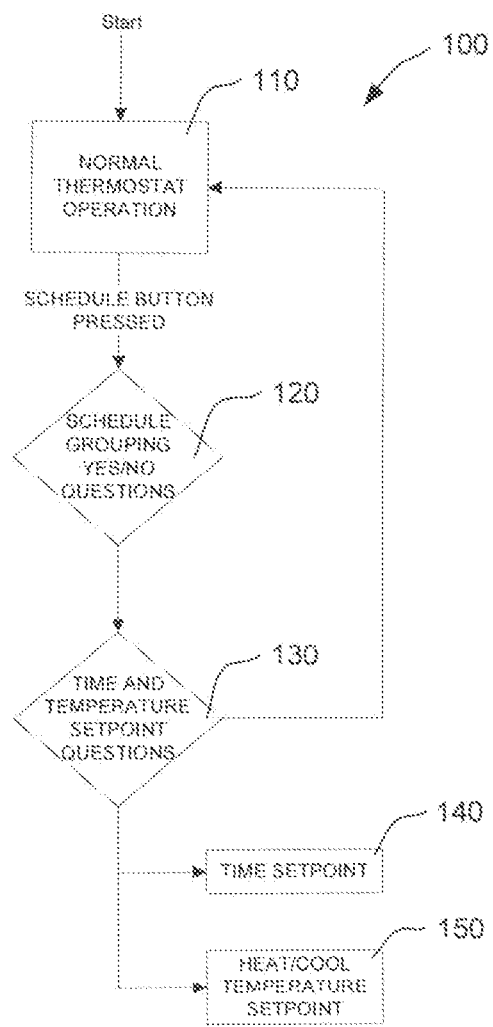
FIG. 1 is a flow diagram of an illustrative HVAC interview program.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Generally, the present invention pertains to simplified interfaces for controllers having interview programming capabilities. These controllers can be used in a variety of systems such as, for example, HVAC systems, water heater systems, water softener systems, sprinkler systems, security systems, lighting systems, and the like. The Figures depict HVAC controllers. While the present invention is not so limited, an appreciation of various aspects of the invention will be gained through a discussion of the examples provided below.

FIG. 1 is a flow diagram of an illustrative HVAC interview program 100. The flow diagram starts at a normal thermostat operation block 110. Normal thermostat operation block 110 can be an initial parameter setting operation or a modification of parameter settings. Interview scheduling block 120, 130 provides one or more interview questions to a user via the user interface. The user interface can accept one or more responses to the one or more interview questions from the user via the user interface. The schedule is then built or modified, in some cases by adding or modifying one or more schedule parameters 140, 150, based on the user responses provided via the user interface. Once the schedule parameters 140, 150 are modified, the controller can return to the normal operation block 110, and follow the new schedule.

In some embodiments, the interview scheduling blocks 120 and 130 can provide interview questions that elicit an affirmative (e.g., "yes") or negative (e.g., "no") user response. Alternatively, or in addition, the interview scheduling blocks 120, and 130 can provide include interview questions that allow a user to select one (or more) answers from a predetermined list of answers.

In some embodiments, these interview questions can solicit information from the user regarding the grouping of the controller set points entered or the temporal relationship of the controller set points such as, for example, the interview question may ask "Do you want the schedule to apply to every day of the week?", requiring the user to respond with a "YES" or "NO" answer. The interview scheduling block 120 preferably includes questions that are natural language questions, which may be phrases that have one, two, three, four, five, six, or seven or more words, although this is not required in all embodiments.

Alternatively, or in addition, interview scheduling block 130 can provide interview questions that require a numerical user response. For example, these interview questions can solicit information from the user regarding the specific time and temperature set points for each grouping of controller set points solicited by the interview block 120 described above. Interview block 130 can provide a question such as, for example, "What is a comfortable sleeping temperature in the winter?", requiring the user to respond with a numerical temperature answer. Like interview schedule block 120 above, interview scheduling block 130 can include questions that are natural language questions, which may be phrases that have one, two, three, four, five, six, or seven or more words, although this is not required in all embodiments.

The interview scheduling blocks 120 and 130 can provide one or more interview questions about, for example, which weekdays will have the same schedule?, when a first person wakes up?, when a last person goes to sleep?, when a last person leaves during the day?, when a first person arrives home?, what a comfortable temperature is when heat is on?, what a comfortable temperature is when air conditioning is on?, what a comfortable sleeping temperature is in summer?, and/or what a comfortable sleeping temperature is in winter?

Alternatively, or in addition, the interview scheduling blocks 120 and 130 may provide one or more interview questions that provide a plurality of predetermined answers or responses (e.g., multiple choice format) where the user selects an answer or response. For example, the interview question may provide a question such as, "What type of schedule do you desire?" In this illustrative embodiment, a series of predetermined responses or answers can be provided such as, "Every day of the week is the same," "Weekdays are the same and Saturday/Sunday is the same," "Weekday are the same and Saturday/Sunday is different," "Each Weekday is different and Saturday/Sunday is the same," and "Each day of the week is different."

Alternatively, or in addition, once an initial schedule has been built, the interview scheduling blocks 120, and 130 can display a previous answer that was accepted by the user interface based on the prior built schedule. This illustrative feature can provide the user with a convenient option to select and alter only the schedule parameters 140, 150 that the user desires to modify. This feature can be utilized in all illustrative embodiments described herein, however it is not required.

Figure 2:
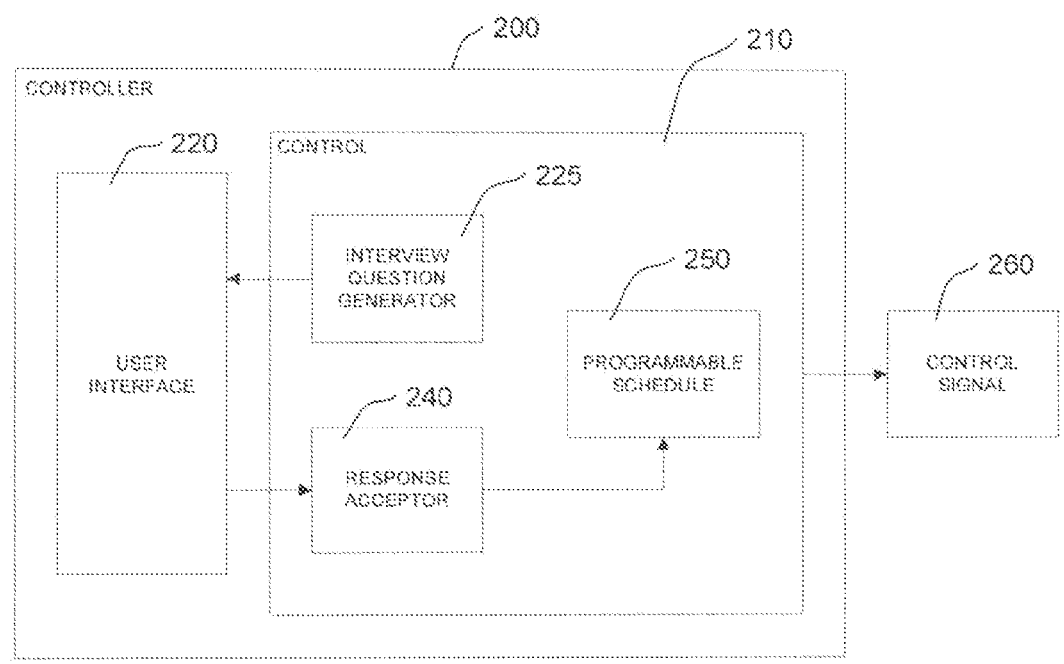
FIG. 2 is a block diagram of the illustrative HVAC interview program shown in FIG. 1.

FIG. 2 is a block diagram of the illustrative HVAC controller with an illustrative interview function similar to that shown in FIG. 1. Controller 200 includes a control module 210 that can be a microprocessor or the like. The control module 210 communicates with a user interface 220, and can include an interview question generator 225, a response acceptor 240 and a programmable schedule 250. The control module 210 can also generate a control signal 260 to a device (not shown), such as an HVAC system or device.

In an illustrative embodiment, the interview question generator 225 provides interview questions, such as those described above, to the user interface 220. The user interface 220 can be any form of user interface such as, for example, a physical interface including a touchscreen, an LCD with buttons, and/or an aural interface including a speaker and microphone, or any other suitable user interface. A user can activate the interview question generator 225 by any suitable mechanism, such as by pressing a schedule button on a touchscreen of the user interface 220. Alternatively, or in addition, the controller 210 may activate the interview question generator 225 on its own, such as when it believes additional scheduling information is needed or might otherwise be desired. In response to questions posed by the interview question generator 225, the user can enter one or more user responses into the user interface 220. The response acceptor 240 accepts the user responses and provides the response to the programmable schedule 250. In some embodiments, the programmable schedule 250 has a number of time and temperature set points that can be entered or modified by the response acceptor 240. Once the schedule is built and/or modified, a control signal 260 is generated by the control module 210 based on the programmable schedule 250.

Figure 3:
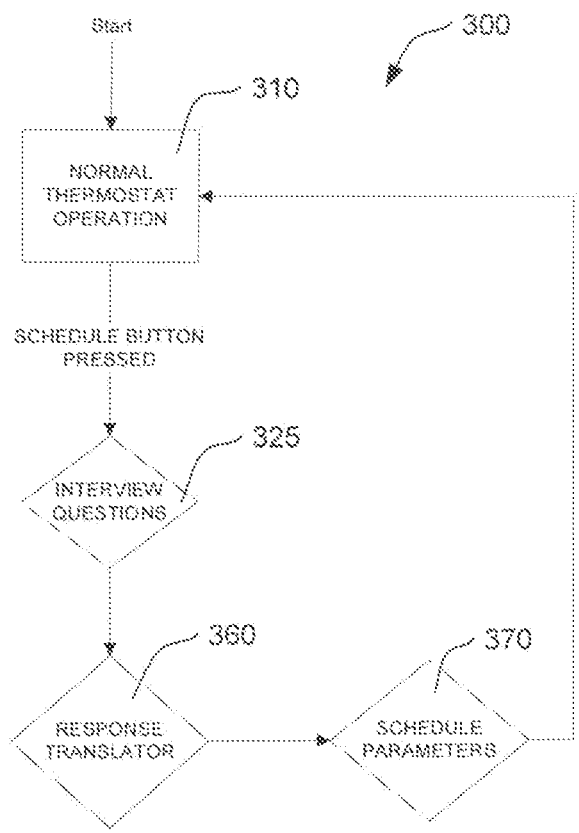
FIG. 3 is a flow diagram of another illustrative HVAC interview program.

FIG. 3 is a flow diagram of another illustrative HVAC interview program 300. The flow diagram starts at a normal thermostat operation block 310. Normal thermostat operation block 310 can be an initial parameter setting operation or a modification of parameter settings. Interview scheduling block 325 provides one or more interview questions to a user via a user interface. The user interface then accepts one or more responses to the one or more interview questions from the user via the user interface. A user response translator 360 translates the one or more user responses to form a translated response. One or more schedule parameters 370 are then modified based on the translated responses from the response translator 360. Once the schedule parameters 370 are modified, the controller can return to the normal operation block 310.

In some embodiments, the interview scheduling block 325 includes interview questions that require an affirmative (e.g., "yes") or negative (e.g., "no") user response. In addition, the interview questions can solicit information from the user regarding the grouping of the controller set points entered or the temporal relationship of the controller set points. For example, the interview question may ask "Do you want the schedule to apply to every day of the week?", requiring the user to respond with a "YES" or "NO" answer. The interview scheduling block 325 can include questions that are natural language questions such as, for example, phrases that can have one, two, three, four, five, six, or seven or more words.

In an illustrative embodiment, interview scheduling block 325 may also provide interview questions that require a numerical user response. These interview questions can solicit information from the user regarding the specific time and temperature set points for each grouping of controller set points solicited by the interview block 325 described above. The interview block 325 can provide a question such as, for example, "What is a comfortable sleeping temperature in the winter?", requiring the user to respond with a numerical temperature answer. The interview scheduling block 325 can include questions that are natural language questions such as, for example, phrases that can have one, two, three, four, five, six, or seven or more words.

In the illustrative embodiment, the interview scheduling block 325 can also provide one or more interview questions related to, for example, which weekdays will have the same schedule?, when a first person wakes up?, when a last person goes to sleep?, when a last person leaves during the day?, when a first person arrives home?, what a comfortable temperature is when heat is on?, what a comfortable temperature is when air conditioning is on?, what a comfortable sleeping temperature is in the summer?, or what a comfortable sleeping temperature is in the winter?

The response translator 360 can translate the user responses to create appropriate schedule parameters 370 that help define the schedule of the controller. That is, the response translator 360 applies the user responses to one or more interview questions to establish the controller schedule. For example, the response translator 360 can take an affirmative user response to the interview question, "Do you want the same schedule for Saturday and Sunday?" and correlate with the interview question, "What temperature do you like when the heat is on?" to establish the schedule parameters for the heating temperature during at least selected periods on Saturday and Sunday.

Alternatively, or in addition, the interview scheduling block 325 may provide one or more interview questions that provide a plurality of predetermined answers or responses (e.g., multiple choice format) where the user selects an answer or response. For example, the interview question may provide a question such as, "What type of schedule do you desire?" In this illustrative embodiment, a series of predetermined responses or answers can be provided such as, "Every day of the week is the same," "Weekdays are the same and Saturday/Sunday is the same," "Weekday are the same and Saturday/Sunday is different," "Each Weekday is different and Saturday/Sunday is the same," and "Each day of the week is different."

Figure 4A:
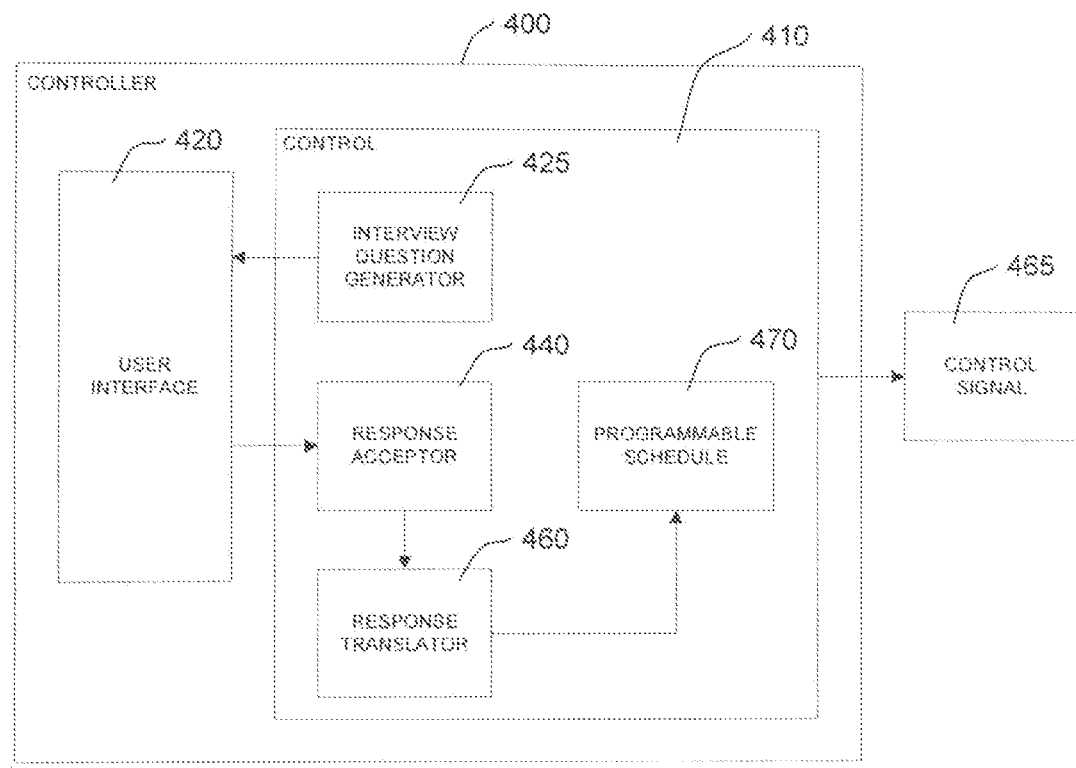
FIG. 4A is a block diagram of the illustrative HVAC interview program shown in FIG. 3.

FIG. 4A is a block diagram of the illustrative HVAC controller with an illustrative interview function similar to that shown in FIG. 3. Controller 400 includes a control module 410 that can be a microprocessor or the like. The control module 410 communicates with a user interface 420, and may include an interview question generator 425, a response acceptor 440, a response translator 460, and a programmable schedule 470. The control module 410 can also generate a control signal 465 to a device (not shown), such as an HVAC system or device.

In the illustrative embodiment, the interview question generator 435 provides interview questions, such as those described above, to the user interface 420. The user interface 420 can be any form of user interface such as, for example, a physical interface including a touchscreen, an LCD with buttons, and/or an aural interface including a speaker and microphone, or any other suitable user interface. A user can activate the interview question generator 435 by any suitable mechanism, such as by pressing a mechanical schedule button on the controller, touching an appropriate region of a touchscreen, voice activation, etc. Alternatively, or in addition, the controller 410 may activate the interview question generator 425 on its own, such as when it believes additional scheduling information is needed or might otherwise be desired. In response to questions posed by the interview question generator 425, the user can enter one or more user responses into the user interface 420. The response acceptor 440 accepts the user responses and provides the response to the response translator 460. The response translator 460 provides a translated response to a programmable schedule 470. In some embodiments, the programmable schedule 470 has a number of time and temperature set points that can be entered or modified by the response translator 470. Once the schedule is built and/or modified a control signal 465 is generated by the control module 410 based on the programmable schedule 470.

Figure 4B:
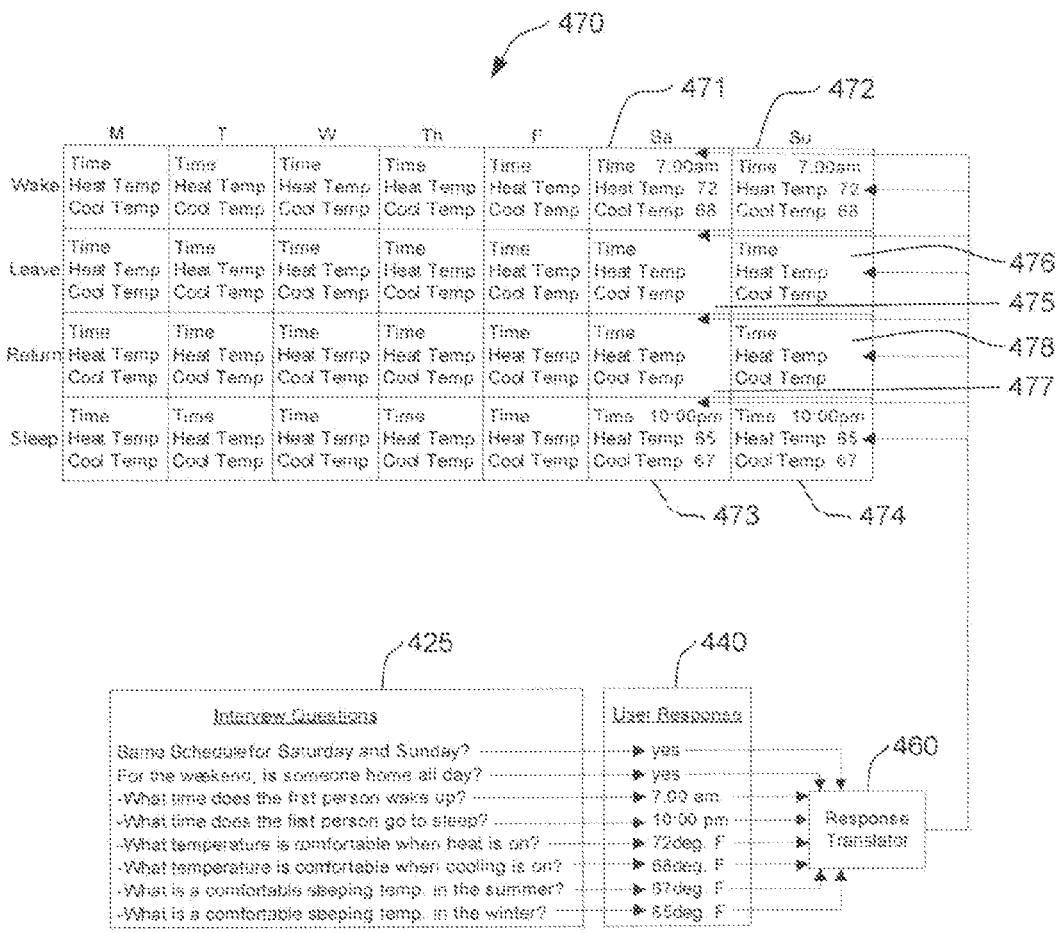
FIG. 4B is an illustrative partial block diagram of the block diagram shown in FIG. 4A.

FIG. 4B is an illustrative partial block diagram of the block diagram shown in FIG. 4A showing one embodiment of the interaction of the interview question generator 425, response acceptor 440, response translator 460 and programmable schedule 470. The illustrative programmable schedule 470 has a plurality of cells such as, for example, a Saturday wake cell 471, a Sunday wake cell 472, a Saturday sleep cell 473, and a Sunday sleep cell 474. In this embodiment, each cell 471, 472, 473, 474 may include a number of schedule parameters such as, for example, a start time, a heat temperature and a cool temperature.

Interview questions 425 are posed to the user. As shown in the illustrative example: an interview question 425 of "Same schedule for Saturday and Sunday?" elicits an user response 440 of "YES"; an interview question 425 of "For the weekend, is someone home all day?" elicits an user response 440 of "YES"; an interview question 425 of "What time does the first person wake up?" elicits an user response 440 of "7:00 a.m."; an interview question 425 of "What time does the last person go to sleep?" elicits an user response 440 of "10:00 p.m."; an interview question 425 of "What temperature is comfortable when the heat is on?" elicits an user response 440 of "72° F."; an interview question 425 of "What temperature is comfortable when the air conditioning is on?" elicits an user response 440 of "68° F."; an interview question 425 of "What is a comfortable sleeping temperature in summer?" elicits an user response 440 of "67° F."; and an interview question 425 of "What is a comfortable sleeping temperature in winter?" elicits an user response 440 of "65° F.".

In the illustrative embodiment, the response translator 460 accepts the user responses provided in block 440. The response translator 460 then builds and/or modifies the programmable schedule 470. In the illustrative embodiment, each cell 471, 472, 473, 474 includes a start time, a heat temperature and a cool temperature. The Saturday wake cell 471 and the Sunday wake cell 472 has a start time of 7:00 a.m., a heat temperature of 72° F., and a cool temperature of 68° F., all of the times and temperatures are provided by the response translator. The Saturday sleep cell 473 and the Sunday sleep cell 474 has a start time of 10:00 p.m., a heat temperature of 65° F., and a cool temperature of 67° F., all of the times and temperatures are provided by the response translator.

In this illustrative embodiment, the response translator 460 takes a plurality of user responses 440 to the interview questions 425 and builds and/or modifies a plurality of schedule parameters. The Saturday and Sunday Leave and Return cells 475, 476, 477, and 478 are ignored and/or zeroed out by the response translator 460 since they are not required based on the user responses 425 for this example.

Figure 5:
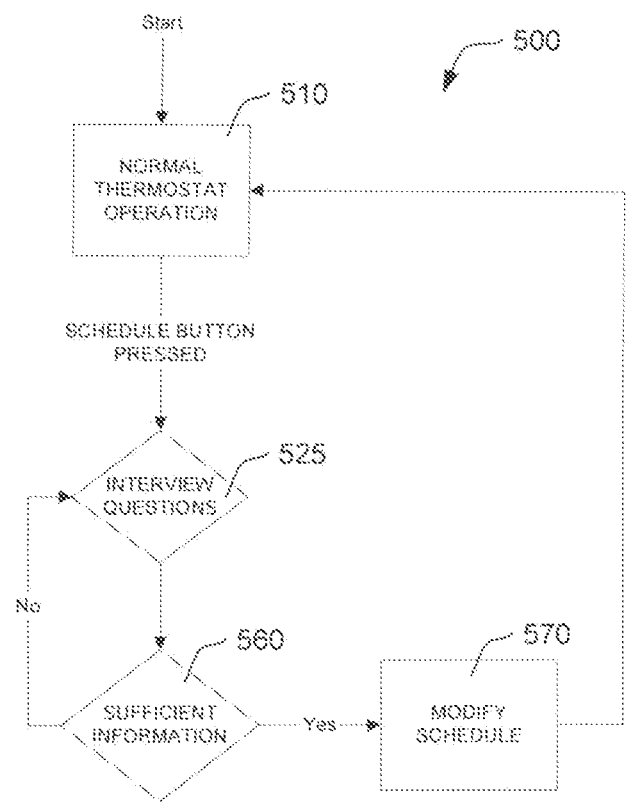
FIG. 5 is a flow diagram of another illustrative HVAC interview program.

FIG. 5 is a flow diagram of another illustrative HVAC interview program 500. The flow diagram starts at a normal thermostat operation block 510. Normal thermostat operation block 510 can be an initial parameter setting operation or a modification of parameter settings. Interview scheduling block 525 provides one or more interview questions to a user via a user interface. The user interface then accepts one or more responses to the one or more interview questions from the user via the user interface. A sufficient information block 560 determines if enough information has been solicited from the user response to the interview questions sufficient to build or modify the schedule at block 570. If not, the interview scheduling block 525 provides another interview question to the user via the user interface. If the sufficient information block 560 determines that enough information has been solicited, then the schedule is built or modified by the modify schedule block 570. Once the schedule is built or modified by the modify schedule block 570, the controller can return to the normal operation block 510.

The sufficient information block 560 can, for example, help ensure that a sufficient number of schedule parameters are defined, such as, for example, a start time, a heating temperature and a cooling temperature for a particular time period such as, for example, a specific day or group of days wake period, leave period, return period and/or sleep period, as shown in FIG. 4B.

In some embodiments, the interview scheduling block 525 provides a number of predetermined interview questions in a predetermined sequential order. The number of questions or queries may be adapted to collect information from the user responses to generate at least a portion of the schedule parameters.

Like above, the interview scheduling block 525 can include interview questions that require an affirmative (e.g., "yes") or negative (e.g., "no") user response. For example, interview scheduling block 525 can provide interview questions solicit information from the user regarding the grouping of the controller set points entered or the temporal relationship of the controller set points such as, for example, "Do you want the schedule to apply to every day of the week?", requiring the user to respond with a "YES" or "NO" answer. The interview scheduling block 525 can include questions that are natural language questions which can be phrases that have one, two, three, four, five, six, or seven or more words in length.

Alternatively or in addition, interview scheduling block 525 can provide interview questions that require a numerical user response. For example, these interview questions can solicit information from the user regarding the specific time and temperature set points for each grouping of controller set points solicited by the interview block 525 described above. The interview block 525 can provide a question such as, for example, "What is a comfortable sleeping temperature in the winter?", requiring the user to respond with a numerical temperature answer. Again, the interview scheduling block 525 can include questions that are natural language questions that can be phrases which can be one, two, three, four, five, six, seven or more words, although this is not required in all embodiments.

The interview scheduling block 525 may also provide one or more interview questions about, which weekdays will have a same schedule?, when a first person wakes up?, when a last person goes to sleep?, when a last person leaves during the day?, when a first person arrives home?, what a comfortable temperature is when heat is on?, what a comfortable temperature is when air conditioning is on?, what a comfortable sleeping temperature is in the summer?, or what a comfortable sleeping temperature is in the winter?

Alternatively, or in addition, the interview scheduling block 525 may provide one or more interview questions that provide a plurality of predetermined answers or responses (e.g., multiple choice format) where the user selects an answer or response. For example, the interview question may provide a question such as, "What type of schedule do you desire?" In this illustrative embodiment, a series of predetermined responses or answers can be provided such as, "Every day of the week is the same," "Weekdays are the same and Saturday/Sunday is the same," "Weekday are the same and Saturday/Sunday is different," "Each Weekday is different and Saturday/Sunday is the same," and "Each day of the week is different."

Figure 6:
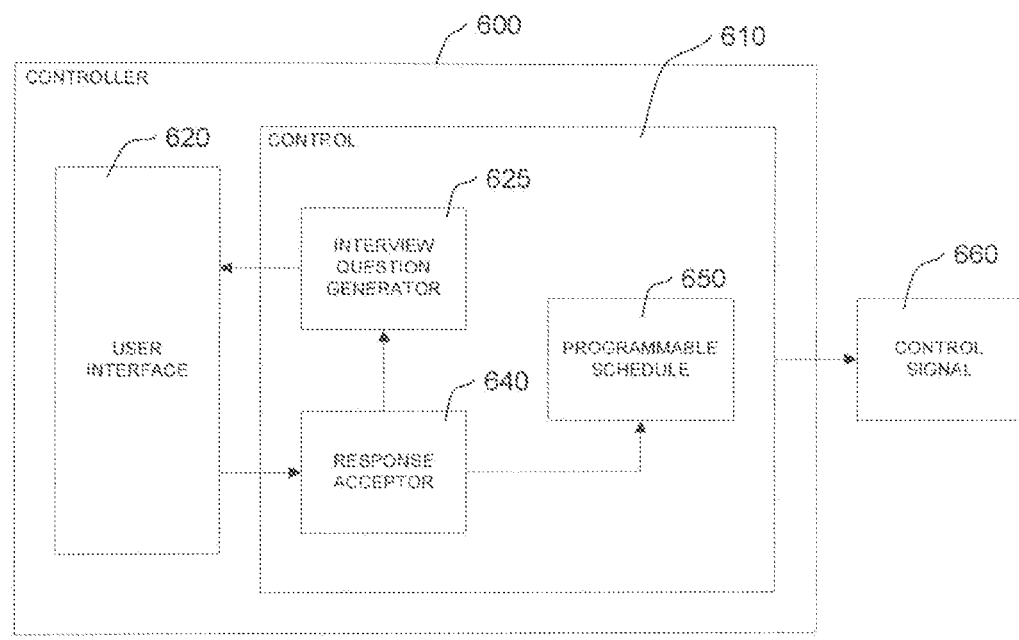
FIG. 6 is a block diagram of the illustrative HVAC interview program shown in FIG. 5.

FIG. 6 is a block diagram of the illustrative HVAC controller with an illustrative interview function similar to that shown in FIG. 5. Controller 600 includes a control module 610 that can be a microprocessor or the like. The control module 610 communicates with a user interface 620, and may include an interview question generator 625, a response acceptor 640 and a programmable schedule 650. The control module 610 can also generate a control signal 660 to a device (not shown), such as an HVAC system or device.

In the illustrative embodiment, the interview question generator 625 provides interview questions, such as those described above, to the user interface 620. The user interface 620 can be any form of user interface such as, for example, a physical interface including a touchscreen, an LCD with buttons, an aural interface including a speaker and microphone, or any other suitable user interface. A user can activate the interview question generator 625 by any suitable mechanism, such as by pressing a schedule button on a touchscreen of the user interface 620. Alternatively, or in addition, the controller 610 may activate the interview question generator 625 on its own, such as when it believes additional scheduling information is needed or might otherwise be desired. In response to the questions posed by the interview question generator 625, the user can enter one or more user responses into the user interface 620. The response acceptor 640 accepts the user responses and provides the responses to the programmable schedule 650 if it determines that sufficient information has been provided by the user responses to establish a program schedule. If not, the response acceptor 640 instructs the interview question generator 625 to provide another interview question to the user via the user interface 620. Once the response acceptor 640 determines that sufficient information has been provided by the user to establish a program schedule 650 the program schedule 650 is built and/or modified. In some embodiments, the programmable schedule 650 has a number of time and temperature set points that can be entered or modified by the response acceptor 640. Once the programmable schedule 650 is built and/or modified, a control signal 660 is generated by the control module 610 based on the programmable schedule 650.

Figure 7A:
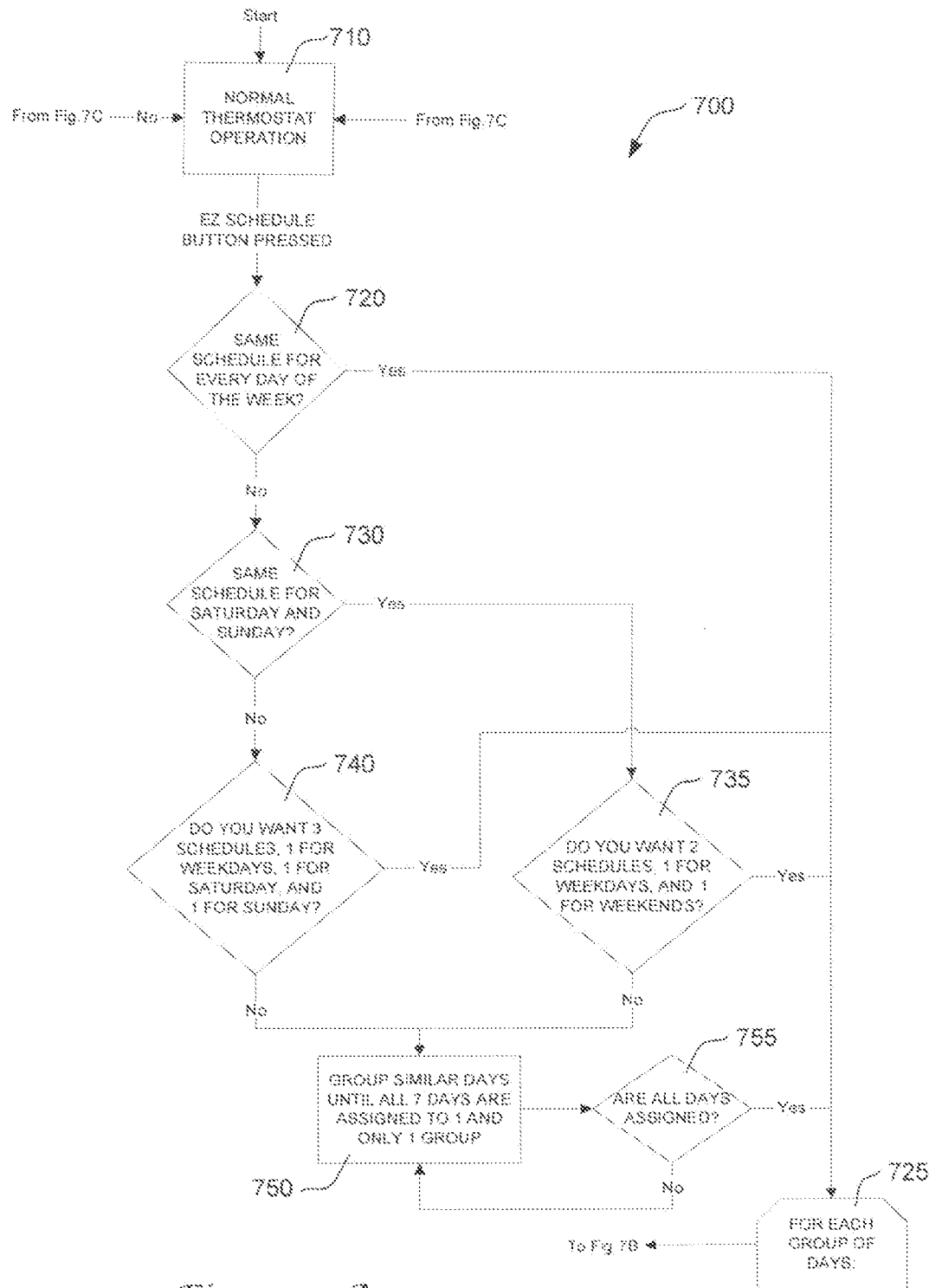
FIGS. 7A-C are flow diagrams of another illustrative HVAC interview program.
Figure 7B:
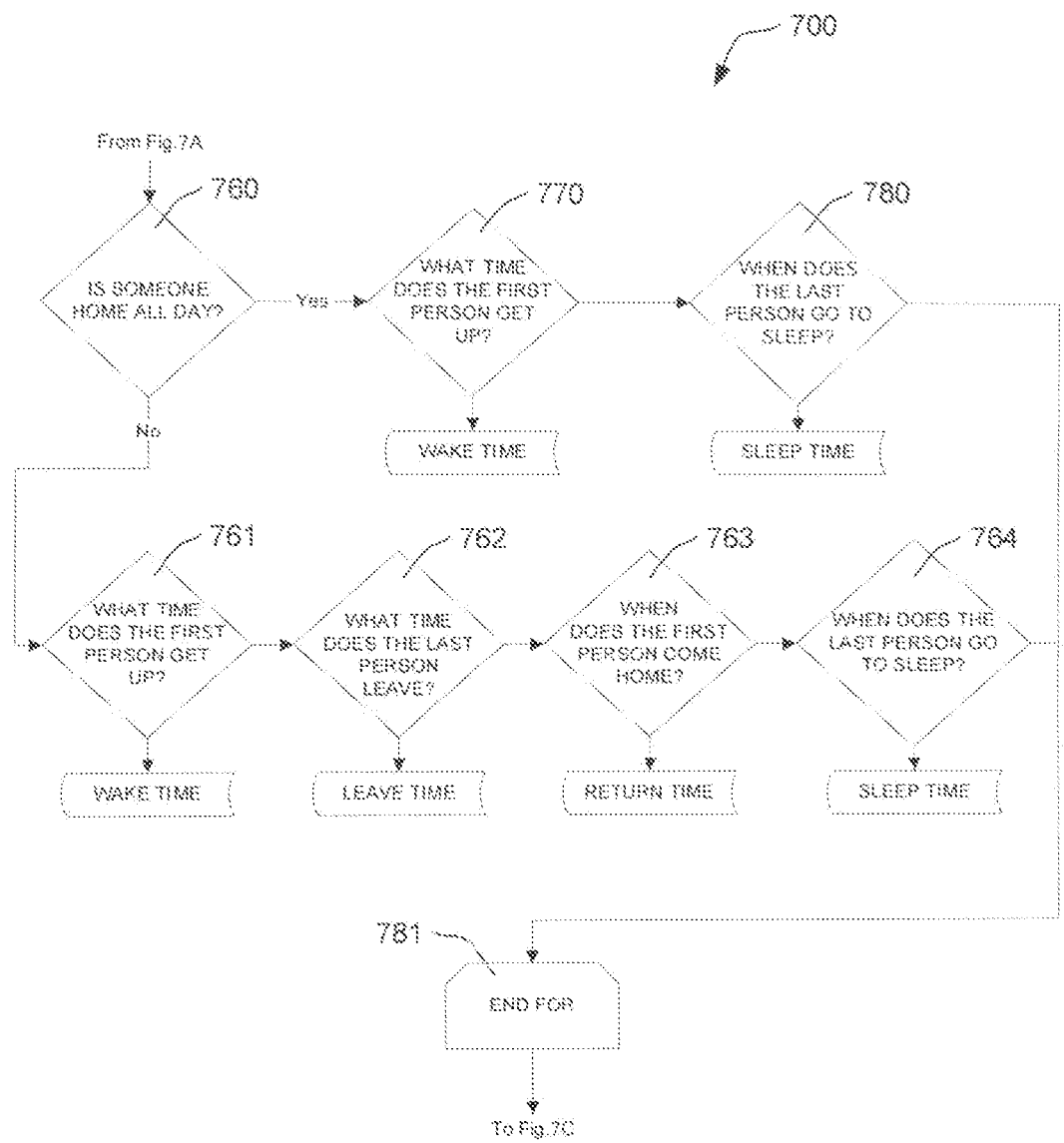
Figure 7C:
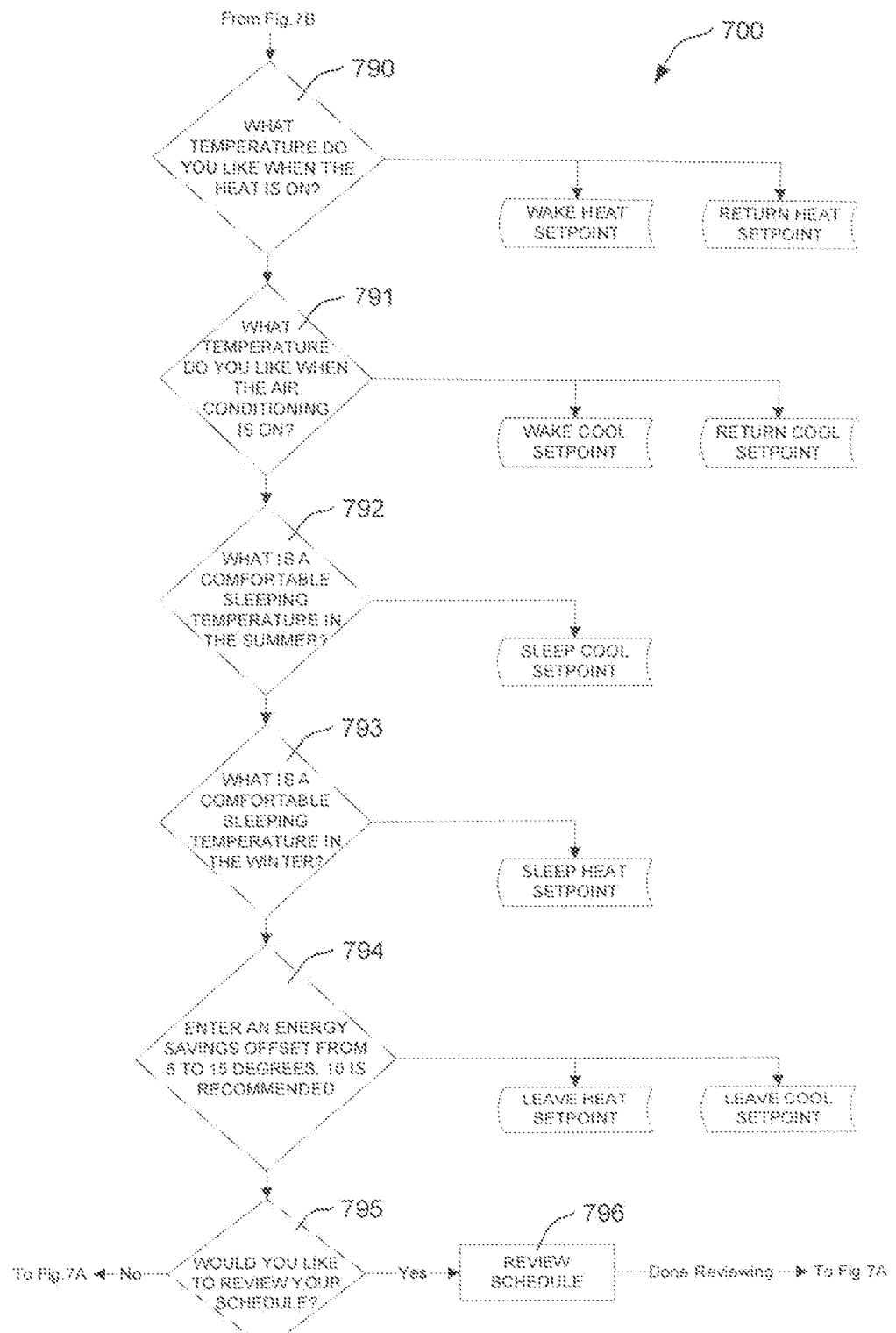

FIGS. 7A-C are flow diagrams of another illustrative HVAC interview program 700. The flow diagram starts at a normal thermostat operation block 710, but this is not required in all embodiments. In the illustrative embodiment, the interview program 700 can be initiated by pressing a program initiation button or key such as, for example, an "EZ Schedule" button.

The program can begin by asking whether the user wants the same schedule to be used for every day of the week, as shown at block 720. If the user responds with a "YES" response, then the program can move to ask context questions for that group of days, as shown at block 725, which may set the schedule for the week assuming the same schedule for every 24 hour period or day. If the user responds with a "NO" response, the program may ask the user if the same schedule applies to both weekend days, Saturday and Sunday, as shown at block 730. If the user responds with a "YES" response, then the program can ask if the user wants two schedules, one for weekdays and one for weekends, as shown at block 735. A "YES response to block 735 can move the program to asking context questions for a weekend group of days and a weekdays group of days, as shown at block 725, to set the schedule for the week assuming a first schedule for weekend days and a second schedule for weekdays. A "NO" response to block 730 can cause the program to ask whether the user wants three schedules including a weekday schedule, a Saturday schedule, and a Sunday schedule, as shown at block 740. A "YES" response to block 740 moves the program to asking context questions for a week day group of days schedule, a Saturday schedule and a Sunday schedule, as shown at block 725, to set the schedule for the week assuming a first schedule for weekdays, and a second schedule for Saturday and a third schedule for Sundays. A "NO" response to either block 740 or block 735 moves the program to asking the user to group each day of the seven days of the week into similar schedule groupings until all days are assigned to one group, as shown at block 750. The program can ask if all days are assigned at block 755, with a "NO" response returning the user to block 750 to assign a non-assigned day or days until all days have been assigned. Once all days have been assigned to a group, the program moves to asking context questions for each group of days schedule, as shown at block 725, to set the schedule for the each grouping of days assuming a first schedule for a first group, a second schedule for a second group, a third schedule for a third group and so on until all groupings of days are scheduled.

The program 700 can ask a variety of context sensitive question to determine the desired schedule for each grouping of days identified by the program 700 above. For example, and as shown in FIG. 7B, the program 700 can inquire whether someone is home all day, as shown at block 760. If the user enters a "YES" response to block 760, the program can ask when the first person gets and request that the user to enter a wake time, as shown at block 770. Then the program 700 can ask when the last person goes to sleep and request that the user to enter a sleep time, as shown at block 780. If the user enters a "NO" response to block 760, the program can ask when the first person gets up, and request that the user to enter a wake time, as shown at block 761. Then the program can ask what time the first person leaves home and request that the user enter a leave time, as shown at block 762. The program can also ask when the last person gets home for the day, and request the user to enter a return time, as shown at block 763. The program can also ask when the last person goes to sleep, and request that the user enter a sleep time, as shown at block 764. Once all the above information has been entered by the user for each grouping of days, the program may move to an end block 781.

The program 700 can then request information from the user regarding comfortable awake, sleeping and away temperatures. For example, and referring to FIG. 7C, the program can request that the user enter a comfortable temperature when the heat is on, as shown at block 790. The temperature information received in block 790 can be automatically inserted into a program schedule for each grouping of days to set the wake heat and return heat set points. The program can also request that the user enter a comfortable temperature when the air conditioning is on, as shown at block 791. This information can be automatically inserted into a program schedule for each grouping of days to set the wake cool and return cool set points. This illustrative program can also request that the user enter a comfortable summer sleeping temperature, as shown at block 792. This information can be automatically inserted into a program schedule for each grouping of days to set the sleep cool set point. The program can also request that the user enter a comfortable winter sleeping temperature, as shown at block 793. This information can be automatically inserted into a program schedule for each grouping of days to set the sleep heat set point. The program can also request that the user to enter an energy savings offset at block 794. This information can be automatically inserted into a program schedule for each grouping of days to set the leave cool and leave heat set points.

In some embodiments, the program 700 can allow the user to request a schedule review at block 795, which can allow the user to review the built or modified schedule, as shown at block 796. If the user does not wish to review the schedule or when the user is done reviewing the schedule, the program returns to normal thermostat operation block 710 under the newly built or modified schedule.

Figure 8A:
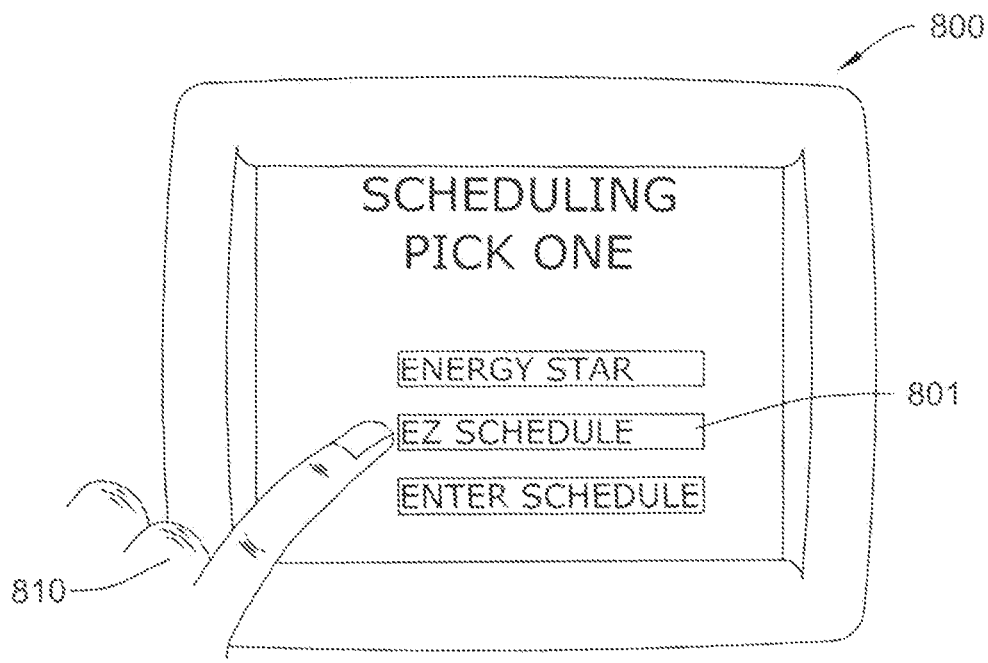
FIGS. 8A-T are schematic drawings of an illustrative HVAC interface showing an embodiment of the flow diagram of the illustrative HVAC interview program shown in FIG. 7.
Figure 8B:
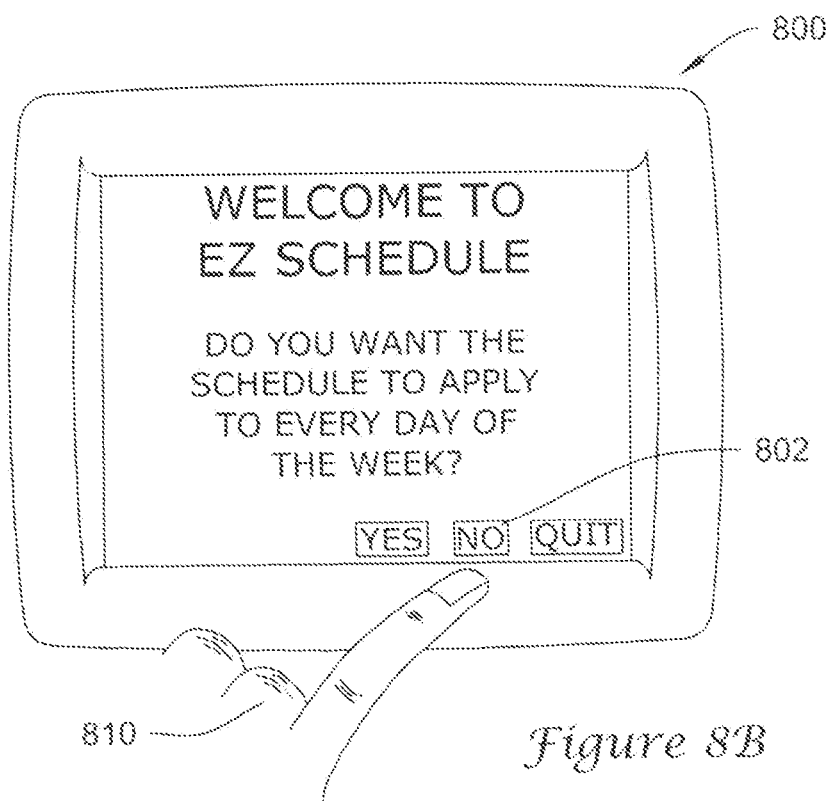
Figure 8C:
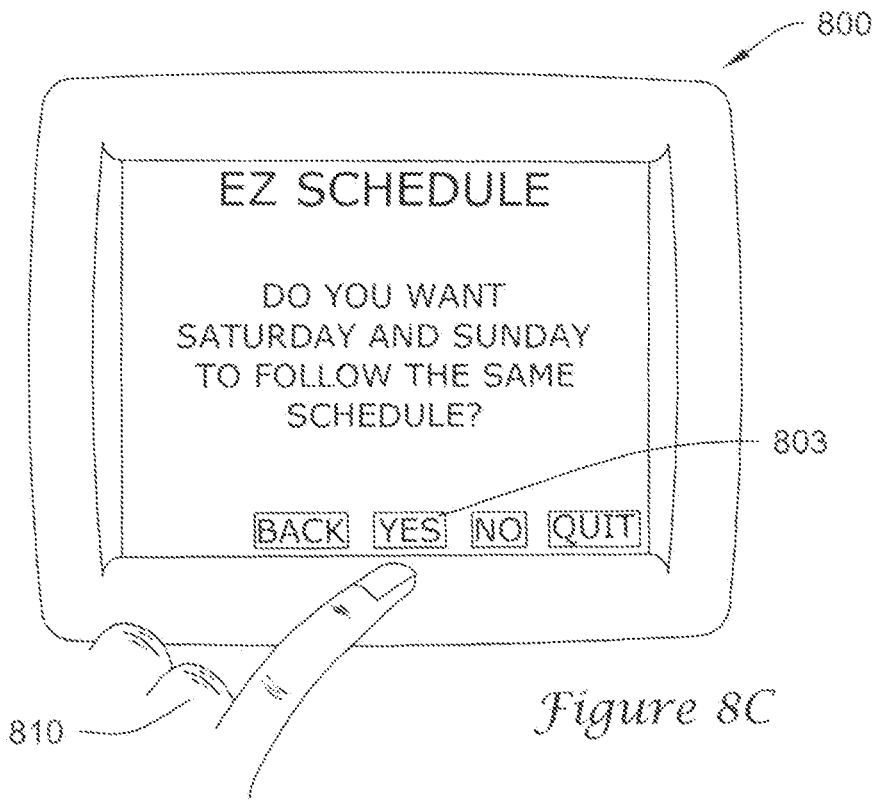
Figure 8D:
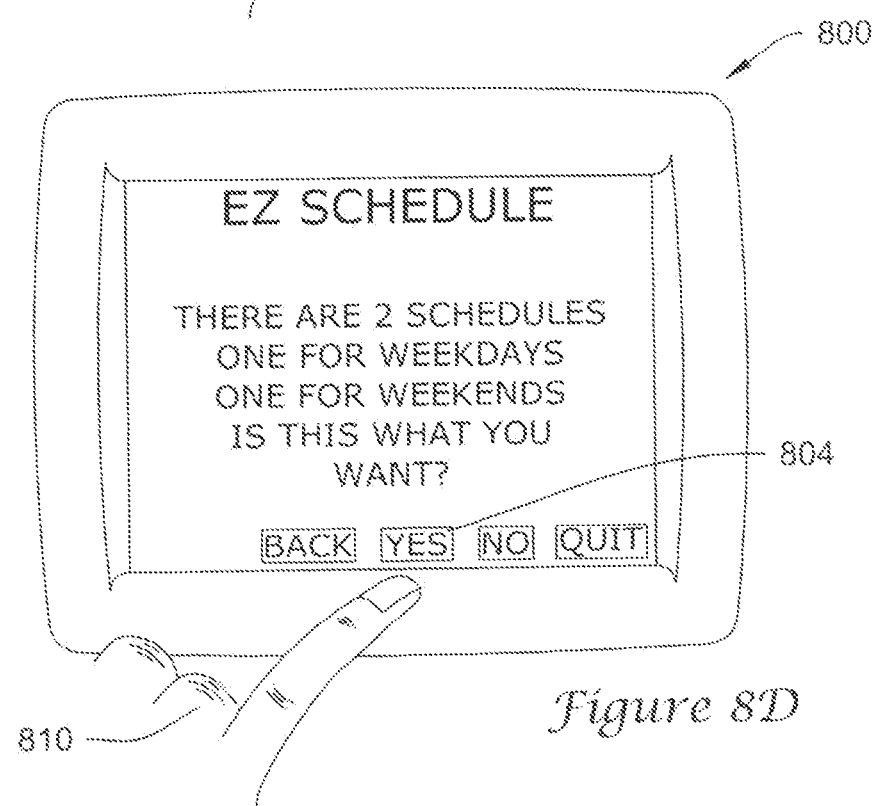
Figure 8E:
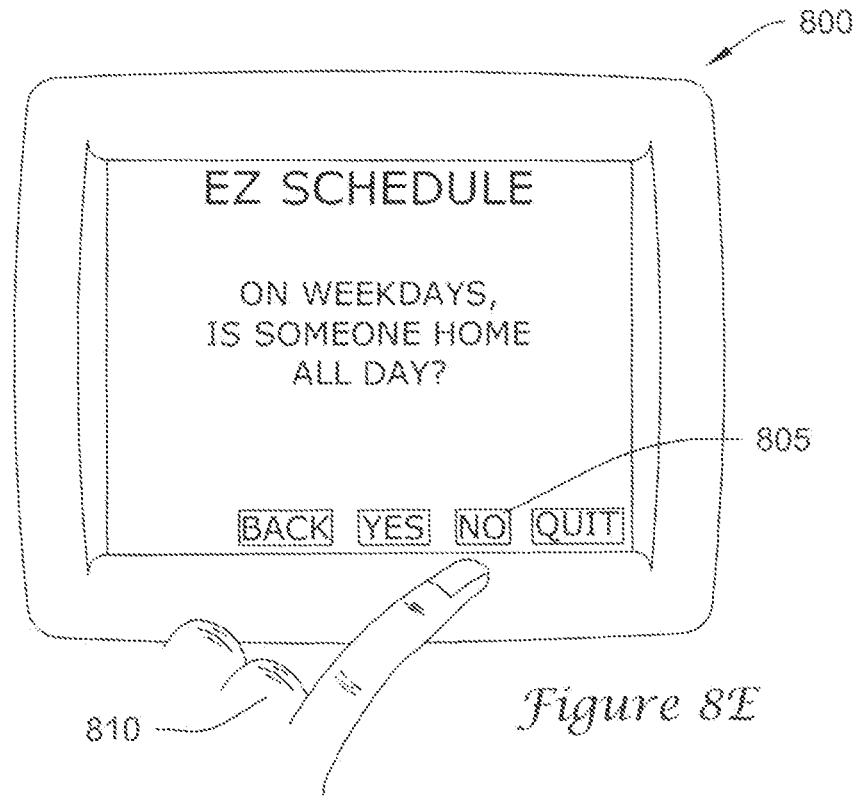
Figure 8F:
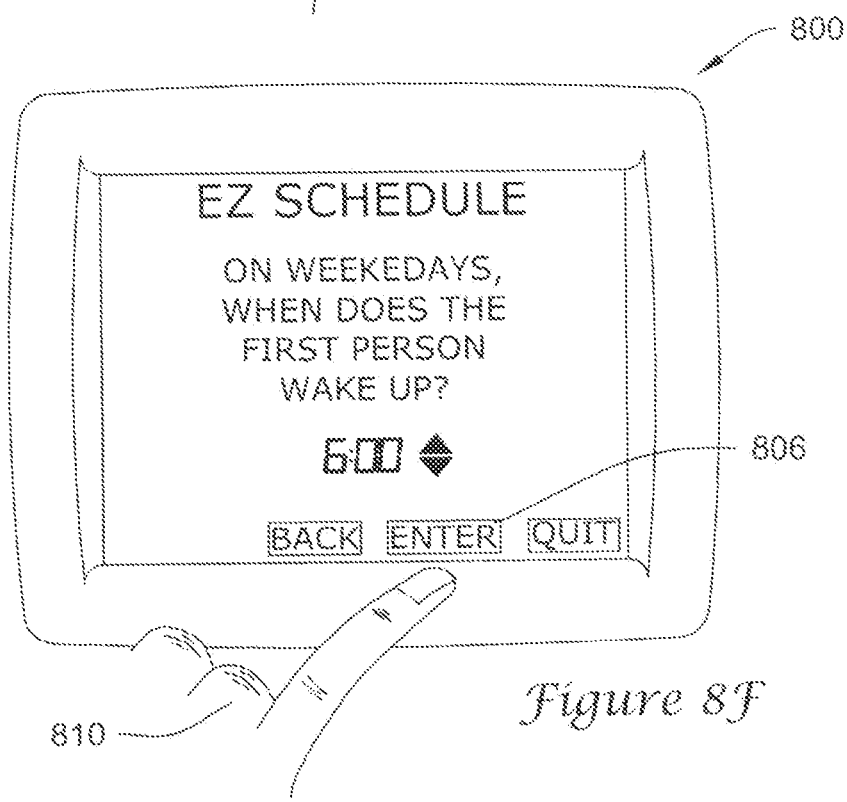
Figure 8G:
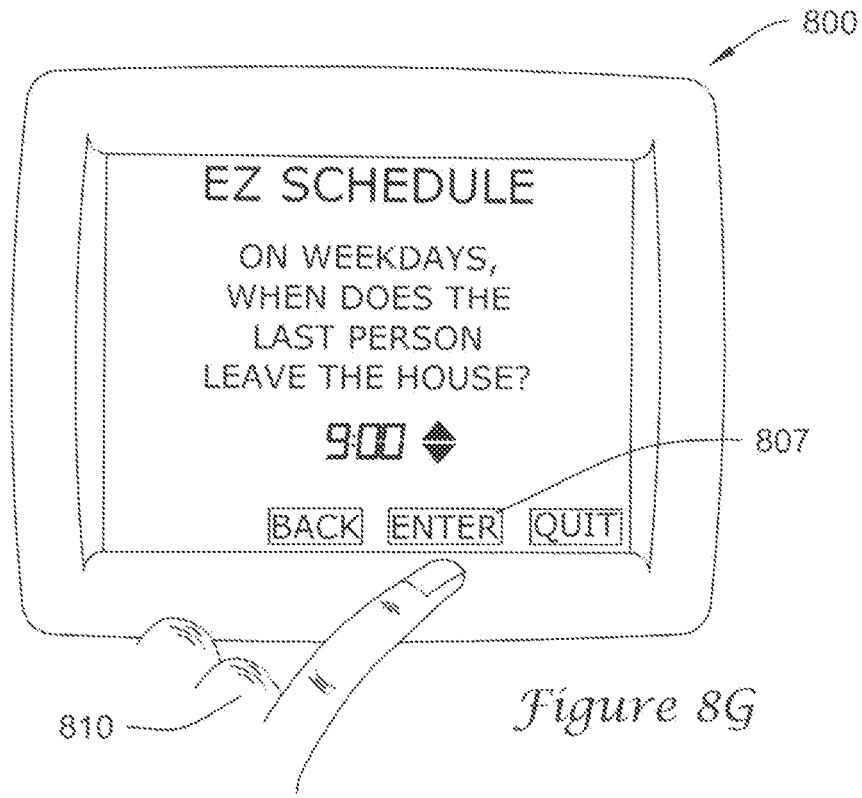
Figure 8H:
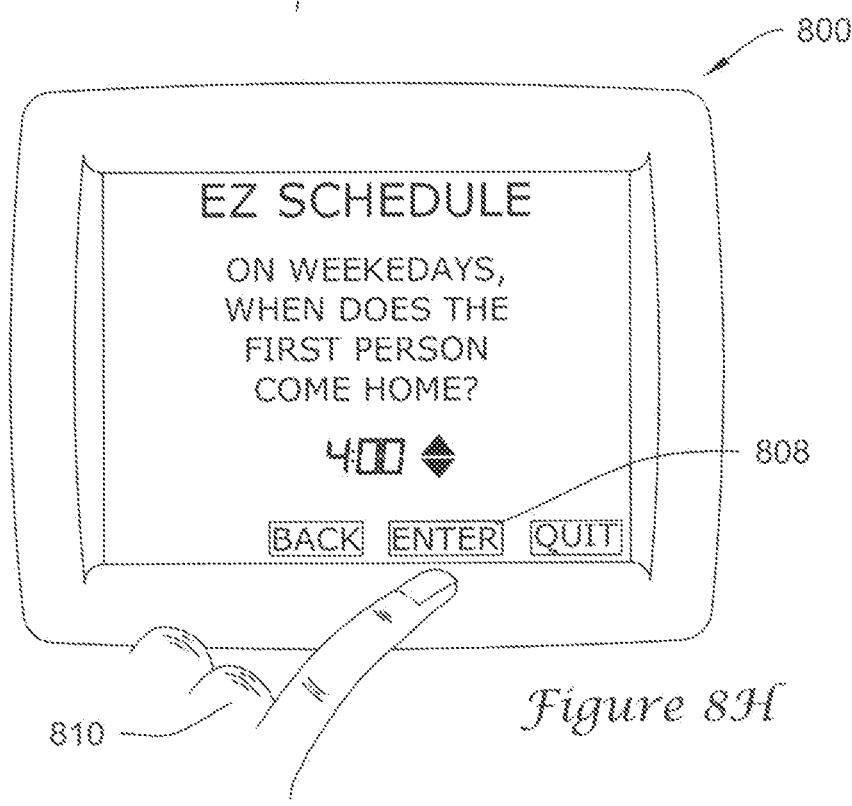
Figure 8I:
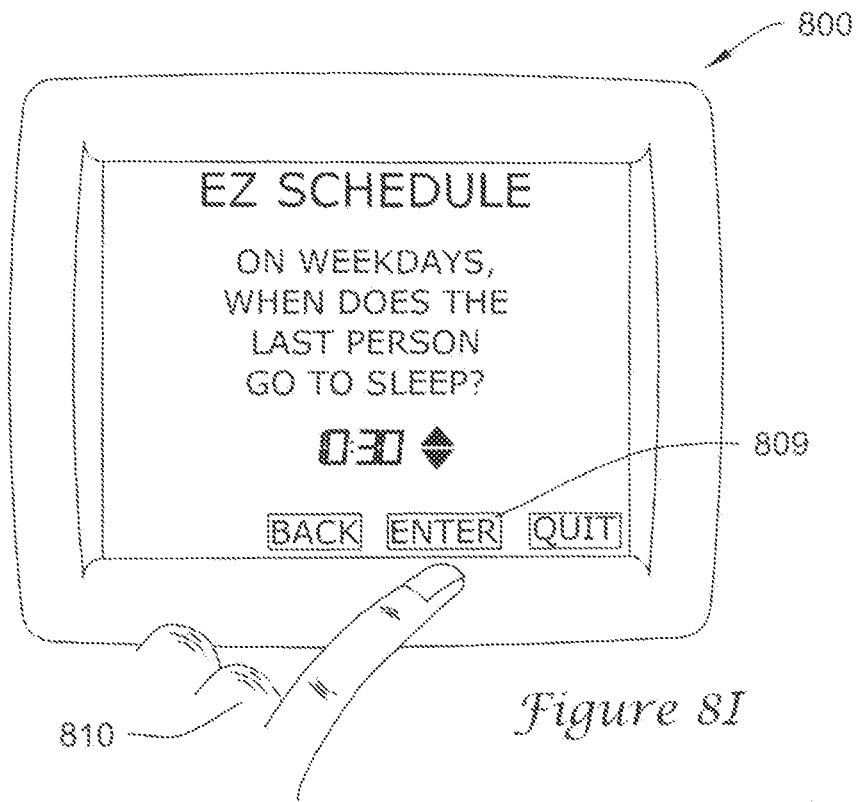
Figure 8J:
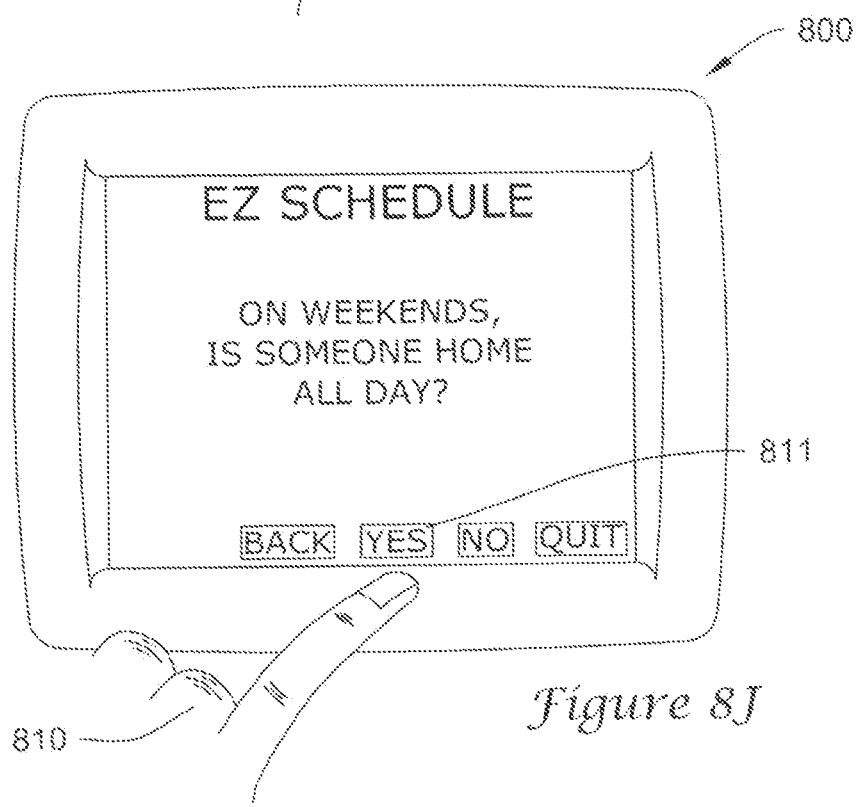
Figure 8K:
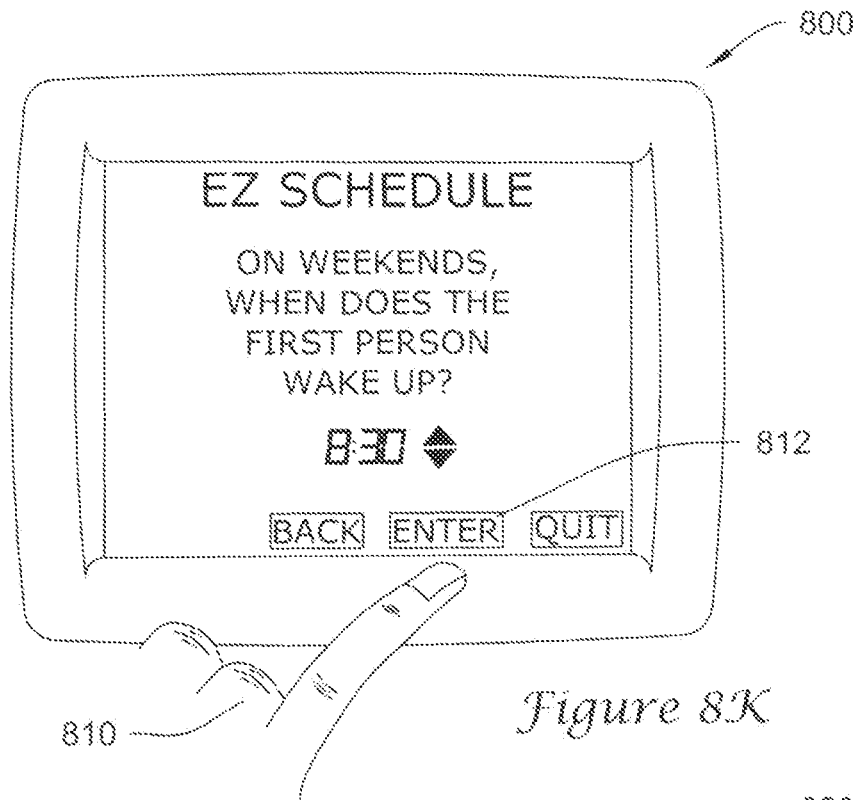
Figure 8L:
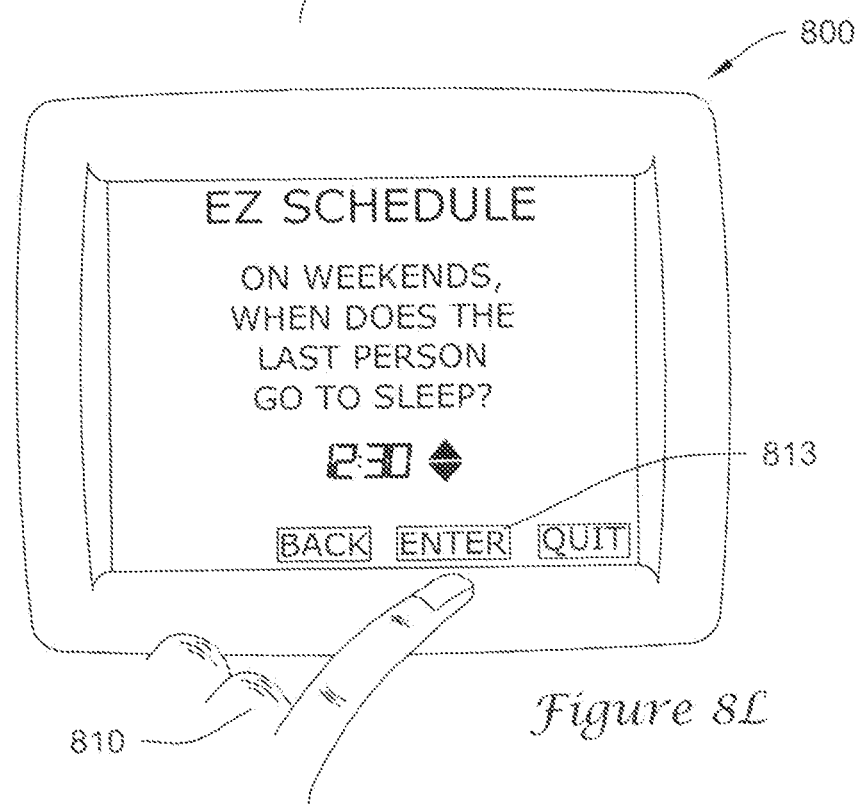
Figure 8M:
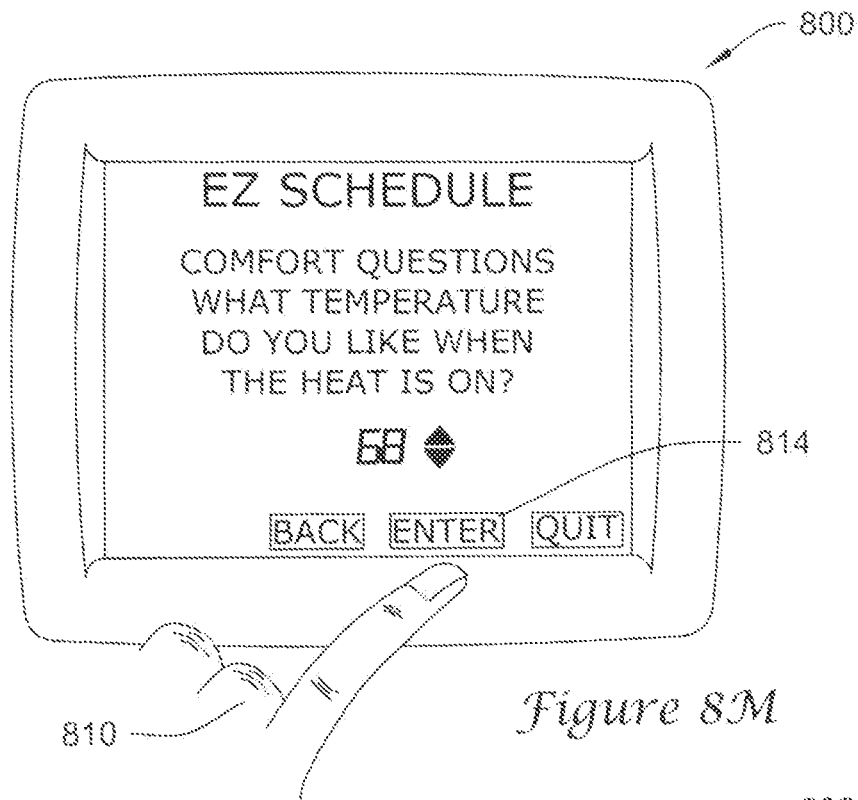
Figure 8N:
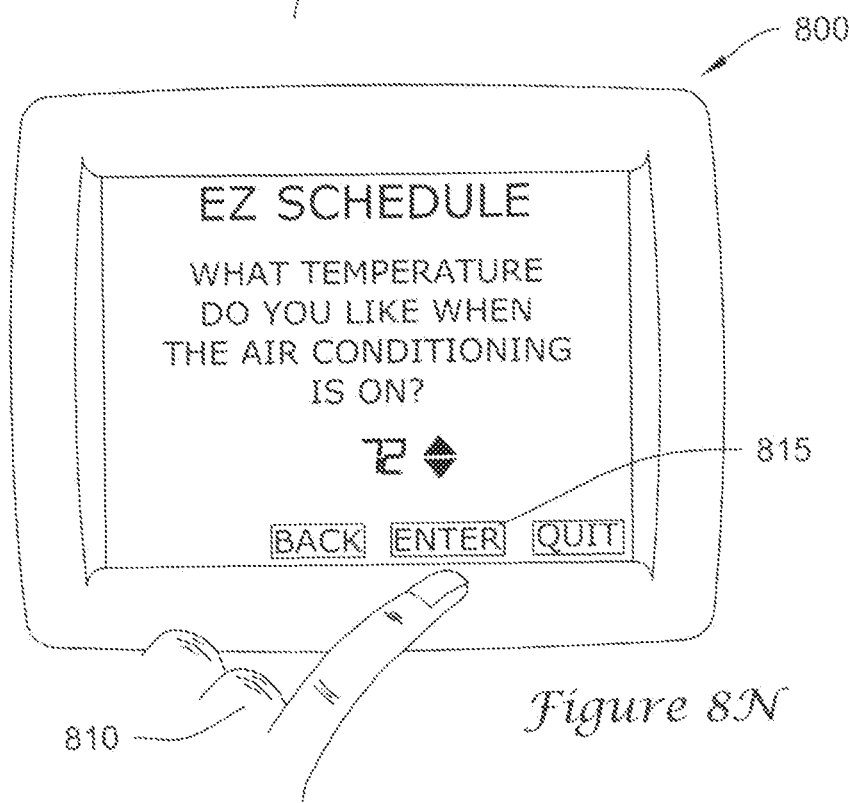
Figure 8O:
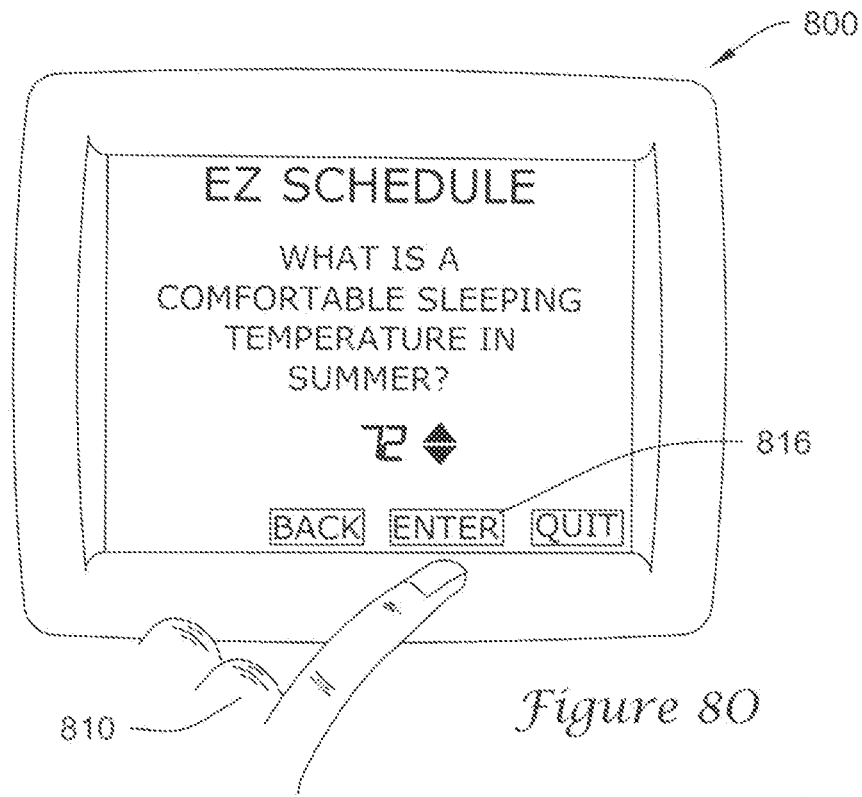
Figure 8P:
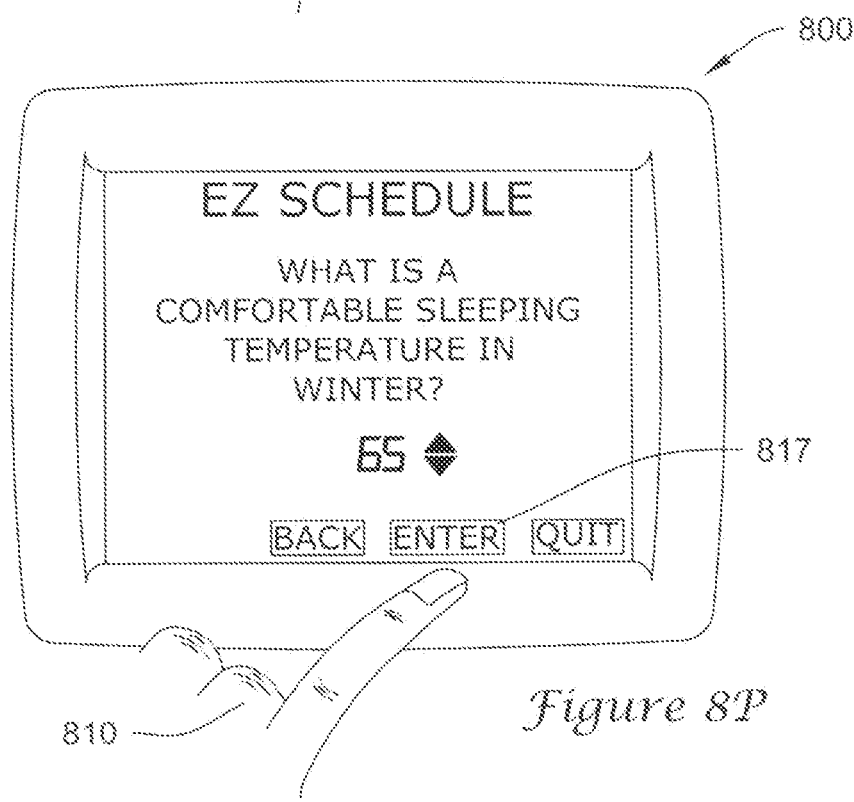
Figure 8Q:
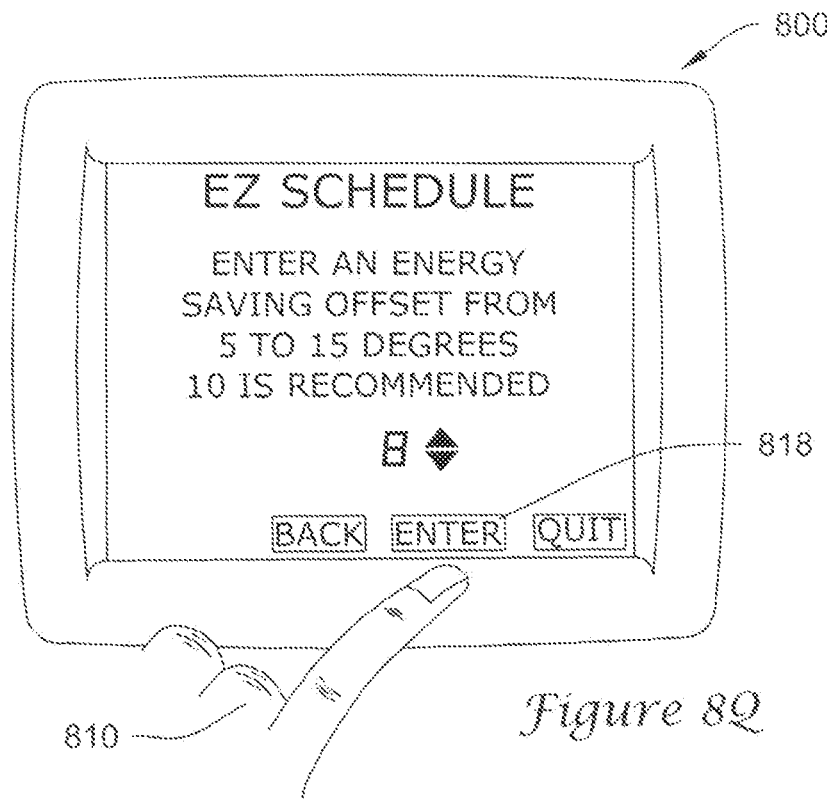
Figure 8R:
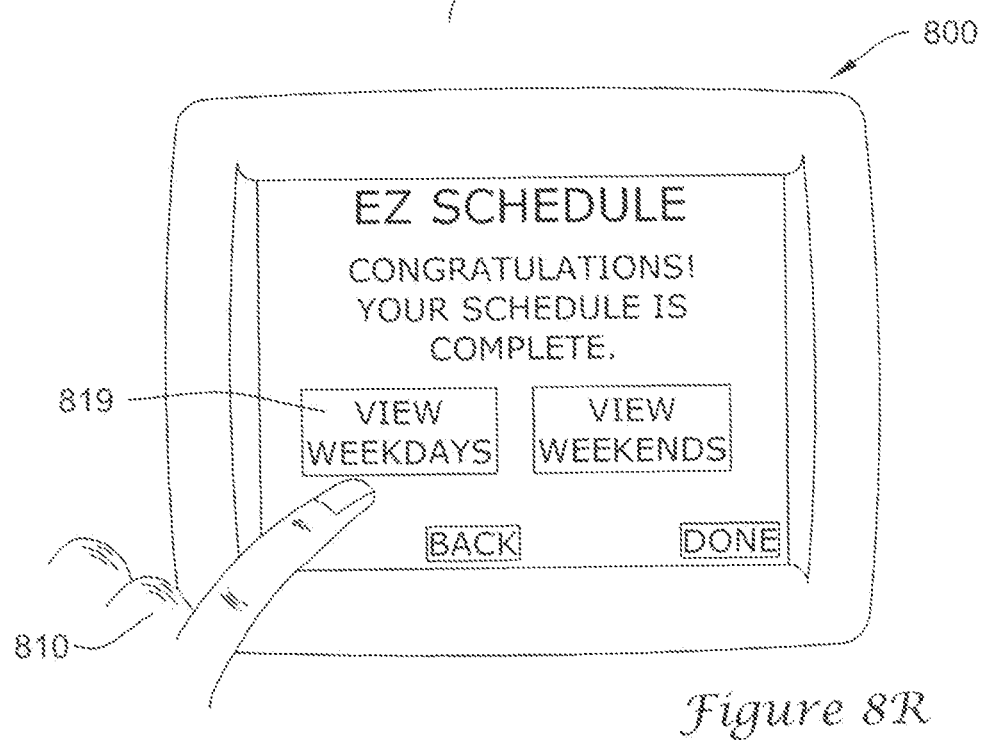
Figure 8S:
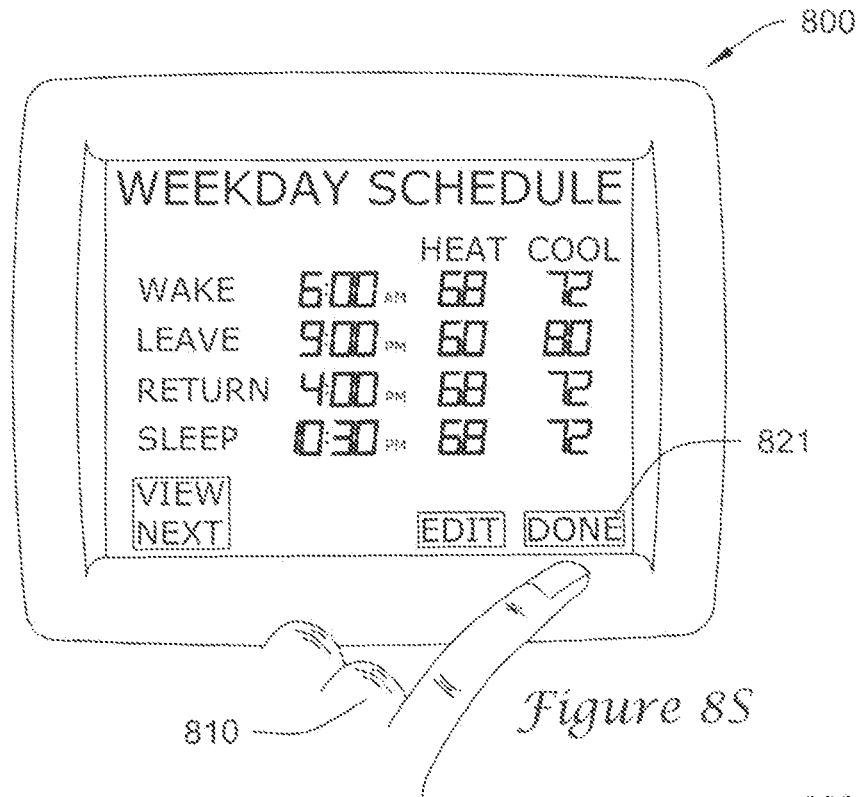
Figure 8T:
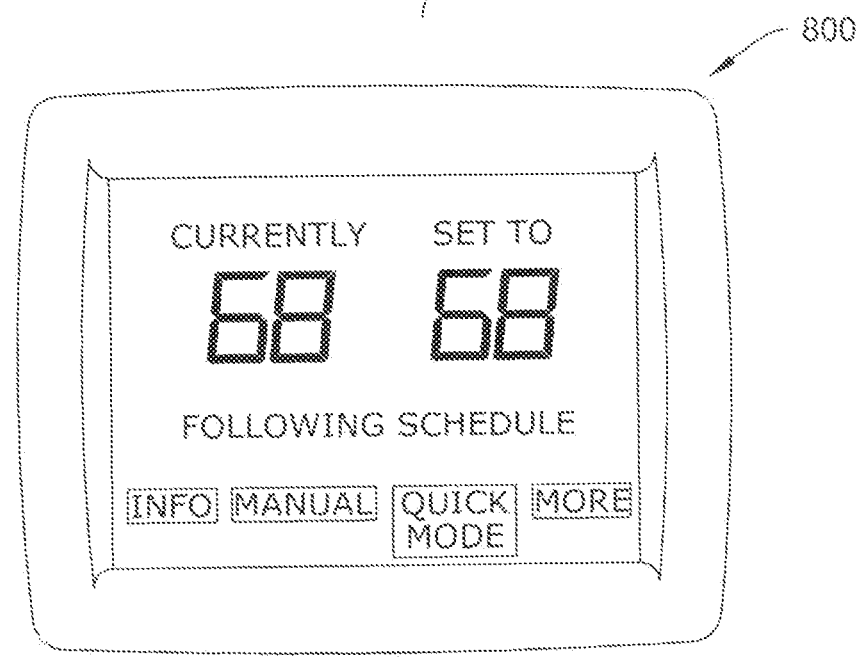

FIGS. 8A-T are schematic drawings of an illustrative HVAC interface 800 showing an illustrative embodiment of the flow diagram of the HVAC interview program shown in FIGS. 7A-7C. The schematic screen shots are taken in sequential order based on the user selections shown in each screen shot. At FIG. 8A, a user 810 selects an "EZ Schedule" 801 button located on the interface 800 to begin the interview scheduling program.

At FIG. 8B, the program asks the user 810, via the interface 800, if the user 810 wants the same schedule to apply to every day of the week. The user 810 is shown selecting a "NO" response 802.

At FIG. 8C, the program asks the user 810, via the interface 800, if the user 810 wants Saturday and Sunday to follow the same schedule. The user 810 is shown selecting a "YES" response 803.

At FIG. 8D, the program asks the user 810, via the interface 800, to verify the there will be two schedules, one for weekends and a second for weekdays. The user 810 is shown selecting a "YES" response 804.

At FIG. 8E, the program asks the user 810, via the interface 800, whether someone will be home all day on weekdays. The user 810 is shown selecting a "NO" response 805.

At FIG. 8F, the program asks the user 810, via the interface 800, to enter what time the first person wakes up on weekdays. The user 810 is shown pressing an "ENTER" button 806 after selecting a wake time.

At FIG. 8G, the program asks the user 810, via the interface 800, to enter what time the last person leaves the house on weekdays. The user 810 is shown pressing an "ENTER" button 807 after selecting a leave time.

At FIG. 8H, the program asks the user 810, via the interface 800, to enter what time the first person arrives home on weekdays. The user 810 is shown pressing an "ENTER" button 808 after selecting a return time.

At FIG. 8I, the program asks the user 810, via the interface 800, to enter what time the last person goes to sleep on weekdays. The user 810 is shown pressing an "ENTER" button 809 after selecting a sleep time.

At FIG. 8J, the program asks the user 810, via the interface 800, whether someone will be home all day on weekends. The user 810 is shown selecting a "YES" response 811.

At FIG. 8K, the program asks the user 810, via the interface 800, to enter what time the first person wakes up on weekends. The user 810 is shown pressing an "ENTER" button 812 after selecting a wake time.

At FIG. 8L, the program asks the user 810, via the interface 800, to enter what time the last person goes to sleep on weekends. The user 810 is shown pressing an "ENTER" button 813 after selecting a sleep time.

At FIG. 8M, the program asks the user 810, via the interface 800, a comfort question such as, what temperature do you like when the heat is on? The user 810 is shown pressing an "ENTER" button 814 after selecting a desired temperature.

At FIG. 8N, the program asks the user 810, via the interface 800, a comfort question such as, what temperature do you like when the air conditioning is on? The user 810 is shown pressing an "ENTER" button 815 after selecting a desired temperature.

At FIG. 8O, the program asks the user 810, via the interface 800, a comfort question such as, what is a comfortable sleeping temperature in the summer? The user 810 is shown pressing an "ENTER" button 816 after selecting a desired temperature.

At FIG. 8P, the program asks the user 810, via the interface 800, another comfort question such as, what is a comfortable sleeping temperature in the winter? The user 810 is shown pressing an "ENTER" button 817 after selecting a desired temperature.

At FIG. 8Q, the program asks the user 810, via the interface 800, another comfort question such as, what energy saving offset is desired? The user 810 is shown pressing an "ENTER" button 818 after selecting a desired energy saving offset.

At FIG. 8R, the program informs the user 810, via the interface 800, that the schedule has been completed, and may allow the user to view a portion of the schedule or selected day groupings. The user 810 is shown pressing a "VIEW WEEKDAYS" button 819.

At FIG. 8S, the program informs the user 810, via the interface 800, specifics of the selected schedule. The user 810 is shown pressing a "DONE" button 821.

At FIG. 8T, the program displays, via the interface 800, specifics of the currently running schedule.

Figure 9:
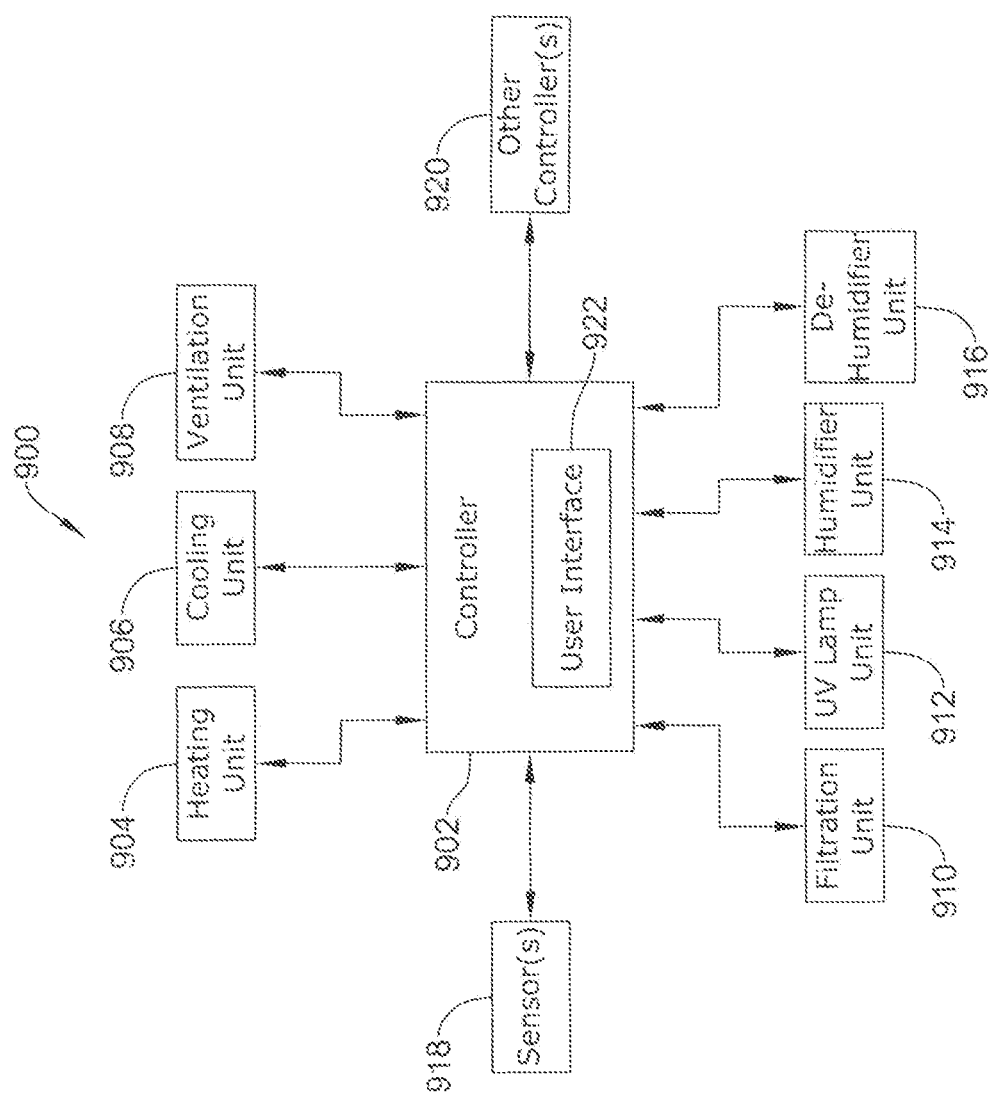
FIG. 9 is a block diagram of an illustrative HVAC system including a programmable controller having interview capabilities for configuring one or more HVAC components.

Referring now to FIG. 9, a block diagram of an illustrative HVAC system including a programmable controller having interview capabilities for configuring one or more HVAC components will now be described. The HVAC system 900 can include a programmable controller 902 in communication with a number of system components that can be activated to regulate various environmental conditions such as temperature, humidity, and air quality levels occurring within the space to be controlled. As shown in FIG. 9, for example, the controller 902 can be connected to a heating unit 904 and cooling unit 906 that can be activated to regulate temperature. The heating unit 904 can include a boiler, furnace, heat pump, electric heater, and/or other suitable heating device. In some embodiments, the heating unit 904 can include a multistage device such as a multistage heat pump, the various stages of which can be controlled by the controller 902. The cooling unit 906 can include an air-conditioner, heat pump, chiller, and/or other suitable cooling device which can likewise be either single staged or multistaged depending on the application.

A ventilation unit 908 such as a fan or blower equipped with one or more dampers can be employed to regulate the volume of air delivered to various locations within the controlled space. A filtration unit 910, UV lamp unit 912, humidifier unit 914, and dehumidifier unit 916 can also be provided in some embodiments to regulate the air quality and moisture levels within the controlled space. One or more local and/or remote sensors 918 can be connected to the controller 902 to monitor temperature or humidity levels inside, and in some cases, outside of the space to be controlled. In some embodiments, the controller 902 can be connected to one or more other controllers 920 such as another HVAC controller for providing multi-zoned climate control. The system components can be directly connected to a corresponding I/O port or I/O pins on the controller 902, and/or can be connected to the controller 902 via a network or the like.

The controller 902 can include a user interface 922 to permit an installer or service technician to input commands for programming the controller 902 to operate with the various system components and any other connected controllers 922. The user interface 922 can include, for example, a touch screen, liquid crystal display (LCD) or dot matrix display, an aural interface including a speaker and microphone, a computer, or any other suitable device for sending and receiving signals to and from the controller 902. Depending on the configuration, the user interface 922 can also include buttons, knobs, slides, a keypad, or other suitable selector means for inputting commands into the controller 902.

Figure 10:
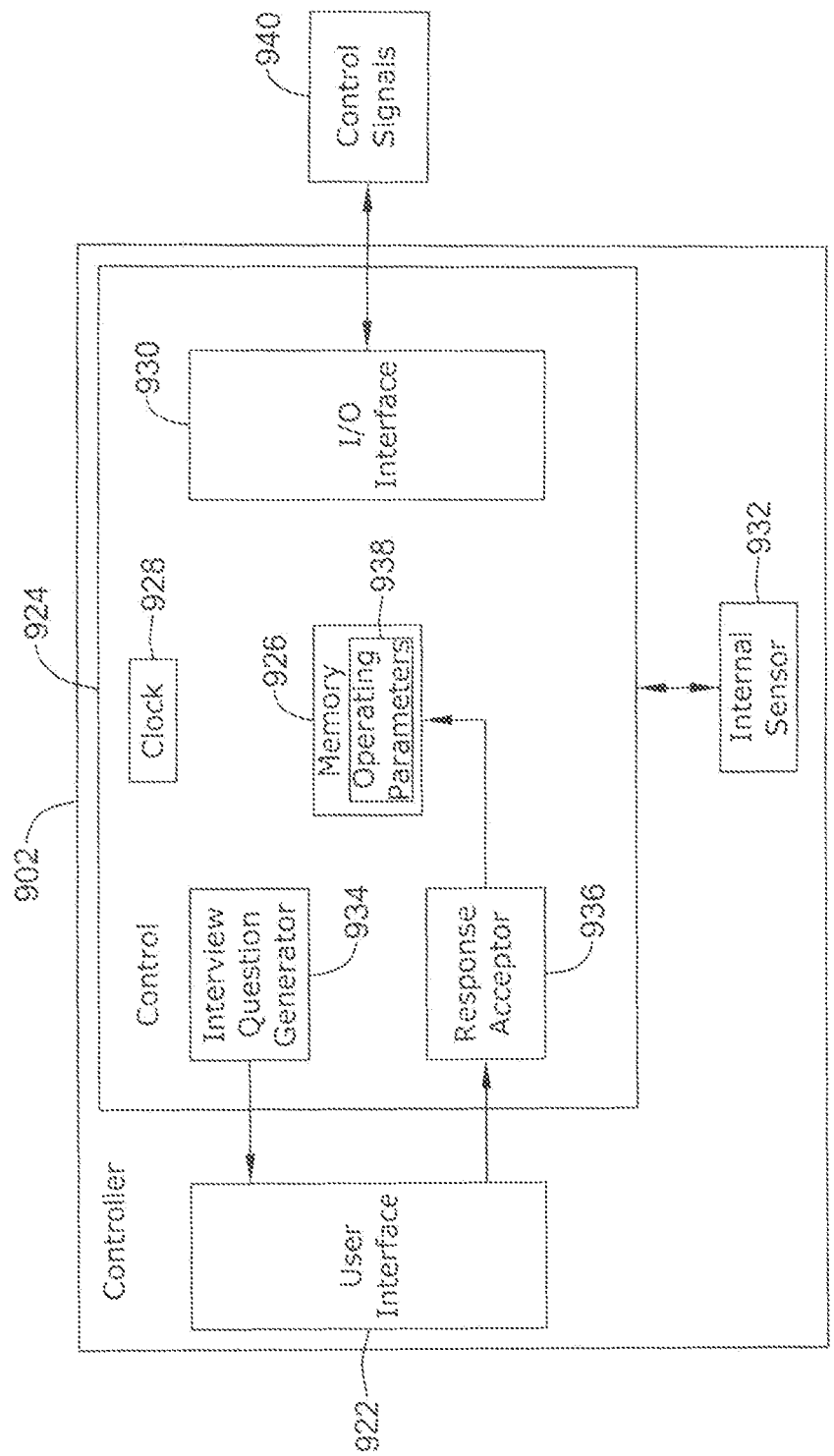
FIG. 10 is a block diagram showing the controller and user interface of FIG. 9.

FIG. 10 is a block diagram showing the controller 902 and user interface 922 of FIG. 9 in greater detail. As can be further seen in FIG. 10, the controller 902 can include a control module 924 such as a microprocessor/CPU, a storage memory 926, a clock 928, and an I/O interface 930 that connects the controller 902 to the various system components in FIG. 9. An internal sensor 932 located within the controller housing can be used to measure the temperature, humidity levels, and/or other environmental conditions occurring within the controlled space.

During installation, the control module 924 communicates with the user interface 922 to provide the installer with interview questions relating to the configuration of one or more of the system components. In the illustrative embodiment of FIG. 10, the controller 902 includes an interview question generator 934 that prompts the installer to provide feedback to the controller 902 regarding the types of system components to be controlled, the dates and times such components are to be operated, the power or temperature levels in which such components are to be operated, the bandwidth or offsets at which such components are to be operated, the type of space to be controlled, as well as other operating parameters. Activation of the interview question generator 934 can occur, for example, by pressing an installation button on a touchscreen or keypad of the user interface 922. Alternatively, or in addition, the controller 902 may activate the interview question generator 934 on its own when a new system component is connected to the I/O interface 930 or when additional setup information is needed or desired by the controller 902.

Input commands received via the user interface 922 can be fed to a response acceptor 936, which accepts the user responses to the interview questions generated by the interview question generator 934. The response acceptor 936 can be configured to translate the user responses into operation parameters 938 that can be stored within the memory unit 926 along with other information such as prior usage, scheduling parameters, user preferences, etc. The operation parameters 938 can then be used by the controller 902 to generate control signals 940 to operate the various system components in a particular manner.

Figure 11:
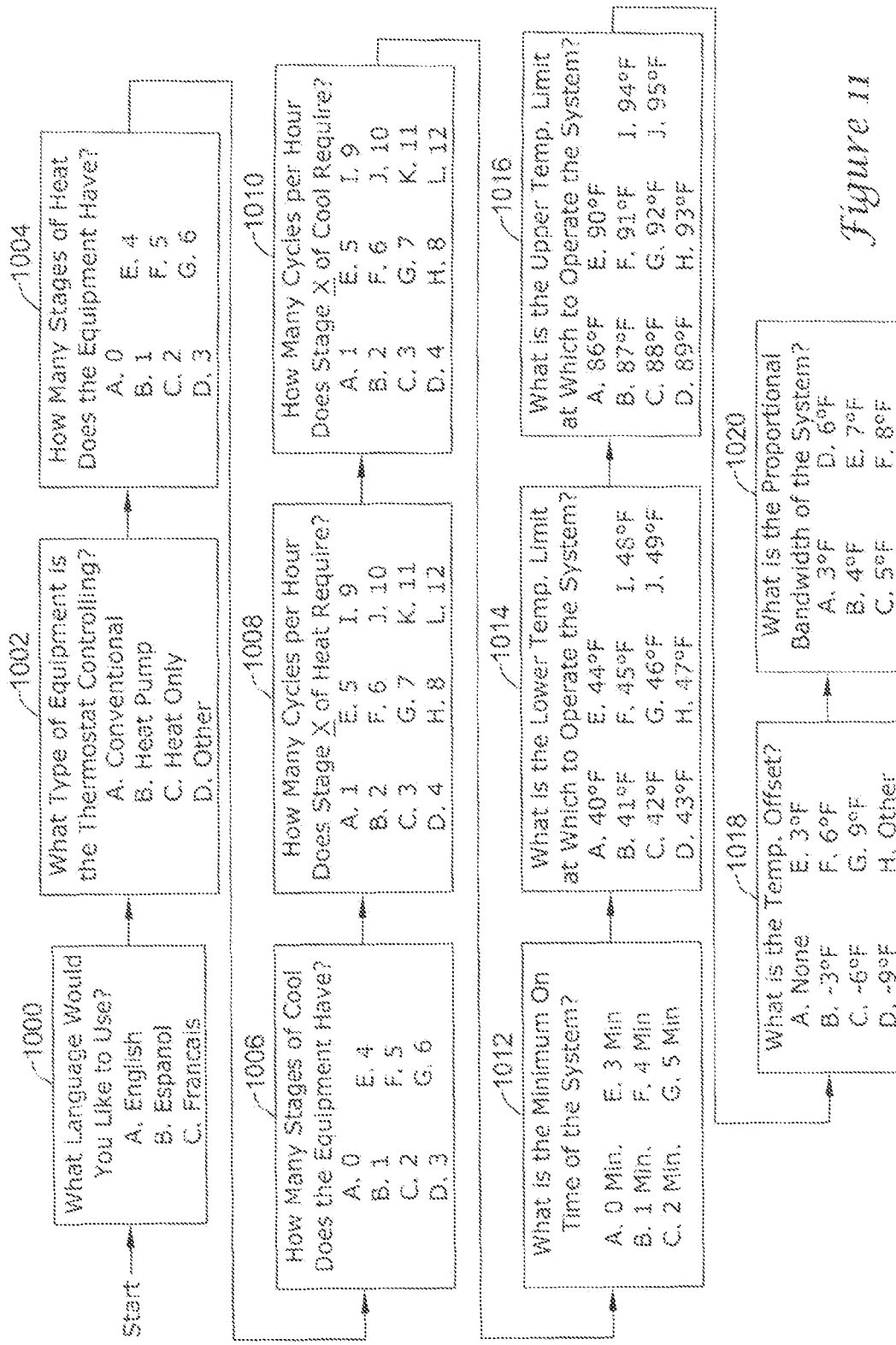
FIG. 11 is a flow diagram showing several illustrative interview questions and answers that can be provided by the interview question generator of FIG. 10.

FIG. 11 is a flow chart showing several illustrative interview questions and answers that can be provided by the interview question generator of FIG. 10. As shown in FIG. 11, once the installation mode has been initiated, the user interface can be configured to prompt the installer to enter a desired language in which to display the interview question and answer queries, as indicated generally by block 1000. For example, the user interface may prompt the installer to select between "English", "Espanol", or "Francais" as language choices. The selection of a particular language at block 1000 causes the user interface to subsequently display the interview questions and answers in that selected language.

Once the desired language is chosen, the user interface can be configured to provide interview questions pertaining to the various system components to be installed. At block 1002, for example, the user interface can prompt the installer to select the type of equipment to be controlled by the controller. In certain embodiments, for example, the user interface can prompt the installer to select between a conventional heating/cooling unit, a heat pump, or heat only. Once the type of equipment has been selected, the user interface may then prompt the installer to enter the number of stages of heat and cool to be controlled by the controller, as indicated generally by blocks 1004 and 1006. In some embodiments, the answers provided to the interview question at block 1004 may affect whether the user interface displays a follow-up query at block 1006. For example, if the response to the interview question regarding the number of heat stages at block 1004 is "2", the interview question generator may assume that there are 2 cooling stages, and thus skip the query at block 1006.

For each stage of heat and cool, the user interface can be configured to prompt the installer to select the number of cycles per hour to be provided by the equipment, as indicated generally by block 1008 and 1010, respectively. At block 1008, for example, the user interface may prompt the installer to select the cycles per hour to be provided by each stage of heating selected at block 1004. If, for example, the installer indicates at block 1004 that the equipment has 3 stages of heating, the user interface can be configured to repeat query block 1008 three separate times for each individual stage to be configured. A similar process can then be performed at block 1010 for each stage of cooling to be controlled by the controller. If at block 1004 the installer indicates that there are "0" stages of heat, the user interface can be configured to skip the query at block 1008. In addition, if at block 1006 the installer indicates that there are "0" stages of cool, or if at block 1002 the installer indicates that the equipment is "Heat Only", the user interface can be configured to skip the query at block 1010.

In some embodiments, the user interface can be further configured to provide the installer with interview questions and answers that can be used to set other operational parameters within the controller. As indicated generally at block 1012, for example, the user interface can be configured to prompt the installer to select the minimum amount of on time that the equipment operates. The user interface can further prompt the installer to select a lower and/or upper temperature limit at which the system operates, as indicated generally at blocks 1014 and 1016, respectively. If desired, the temperature offset and proportional bandwidth of the system can be further set via query blocks 1018 and 1020, respectively.

Although several exemplary interview questions and answers are illustrated in FIG. 11, it should be understood that the type, number, and ordering of the interview questions and answers provided to the installer may be varied based on the type of equipment to be configured, the user's previous answers to interview questions, the number of stages to be controlled, as well as other factors. In some embodiments, the interview questions and answers can be grouped together to permit the installer to configure a particular system component or components without having to answer interview questions for the remaining system components. If, for example, the installer desires to only configure a newly installed heat pump, the user interface can be configured to provide the installer with interview questions and answers relating to the cooling unit, skipping those queries related to other components not affected by the installation.

Figure 12:
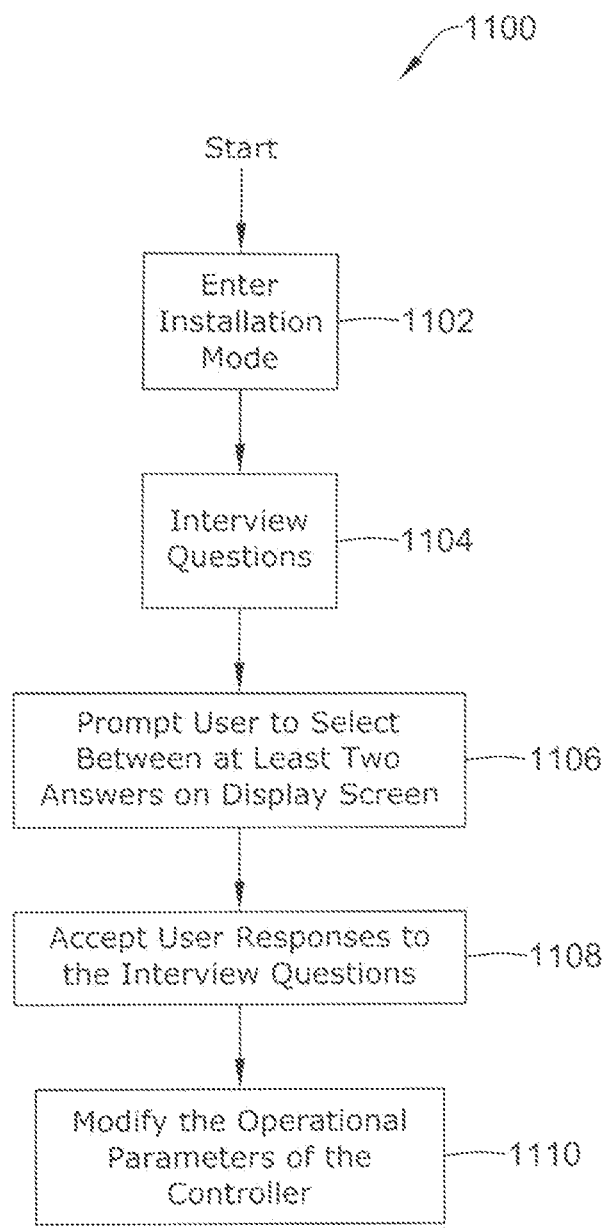
FIG. 12 is a flow diagram of an illustrative method of programming configuration information within a controller.

FIG. 12 is a flow diagram of an illustrative method 1100 of programming configuration information within a controller. The method 1100 can begin generally at block 1102 in which an installation mode of the controller is activated to permit an installer to configure the controller to operate with one or more system components. Initiation of the installation mode can occur, for example, by the installer selecting an installation mode button on a touchscreen or keypad of the user interface, or automatically when the controller is activated for the first time or when one or more system components are connected to the controller.

Once the installation mode has been initiated, the controller can then be configured to provide one or more interview questions to the installer via the user interface, as indicated generally by block 1104. The interview questions provided can be configured to solicit information from the installer regarding the type and configuration of the various system components to be controlled by the controller. In certain embodiments, for example, the interview questions can include a sequence of interview questions relating to the type of equipment to be controlled, the number of heat stages the equipment has, the number of cooling stages the equipment has, the number of cycles per hour each stage of heating requires, and the number of cycles per hour each stage of cooling requires.

In some embodiments, other interview questions pertaining to the type or configuration of the controller and/or any system components controlled by the controller can be further presented to the installer via the user interface. Examples of other interview questions can include, but are not limited to, the minimum operating time desired to operate the system, whether a pump exercise is to be enabled for any installed heat pumps, the upper temperature limit at which to operate the system, the lower temperature limit at which to operate the system, the temperature offset at which the controller operates, the proportional bandwidth of the equipment, the type and operating times of the ventilation fan employed, the type and rating of the UV lamp employed, and the type and rating of the humidifier or dehumidifier employed. Other interview questions relating to the user's preferences such as the date and time format, daylight savings options, schedule programming options, temperature display options, etc. can also be provided, if desired. It should be understood that the types of interview questions and their ordering will vary depending on the type of equipment to be controlled.

The interview questions may be provided to the installer in the form of natural language questions, which may be phrases having one or more words that prompt the installer to select between one or more answers from a predetermined list of answers. For example, the interview questions can include a question such as "What type of equipment is the thermostat controlling?" In some embodiments, one or more of the interview questions may elicit an affirmative "YES" or "NO" user response. Alternatively, or in addition, one or more of the interview questions can solicit information requiring a numeric or alphanumeric user response.

With certain interview questions, and in some embodiments, the controller can be configured to prompt the installer to select between at least two answers or responses displayed on the display screen of the user interface, as indicated generally by block 1106. For example, in response to the interview question "What type of equipment is the thermostat controlling?", the user interface can be configured to display the answers "Conventional", "Heat Pump", and "Heat Only", prompting the installer to select the appropriate type of equipment to be installed and/or configured. The user interface can then be configured to accept the user responses to each of the questions and then modify the operational parameters of the controller based on the user responses, as indicated generally by blocks 1108 and 1110, respectively.

In some embodiments, the user interface can be configured to display each of the answers simultaneously on the display screen of the user interface. In such configuration, the selection of a user response at block 1108 can be accomplished by the installer selecting an answer to the interview question from a list of multiple answers graphically displayed on the screen. In those embodiments in which the user interface includes a touchscreen, for example, the selection of a response can be accomplished directly by pressing the desired answer from a choice of answers provided on the screen, causing the controller to store that parameter and cycle to the next interview question in the queue. Alternatively, in those embodiments in which the user interface includes an LCD or dot matrix screen, the selection of the desired answer from the choice of answers can be accomplished via a button, knob, slide, keypad, or other suitable selector means on the user interface.

The user interface can vary the presentation of the interview questions based at least in part on the installer's previous responses to other interview questions. If, for example, the installer selects on the user interface that the type equipment being installed is "Heat Only", the interview question generator can be configured to skip those questions pertaining to the stages and cycle times for cooling. The ordering of the interview questions can also be varied based on the particular piece of equipment being configured. If, for example, the installation mode at block 1102 is initiated in response to a new piece of equipment connected to the controller, the interview question generator can be configured to present to the installer only those questions pertaining to the new equipment.

The interview question generator can also be configured to suggest a default answer based on any previous responses, based on any previous controller settings, and/or based on settings which are commonly selected for that particular piece of equipment. For example, with respect to the selection of the number of stages for heating, the user interface can be configured to default to a common answer or response of "2" while providing the installer with the ability to select among other numbers of heating stages (e.g., "0", "1", "3", "4", "5", "6", etc.), if desired. The suggestion of a default answer can be accomplished, for example, by highlighting or flashing the answer on the display screen, by moving a selection indicator adjacent to the answer on the display screen, or by other suitable means.

Figure 13A:
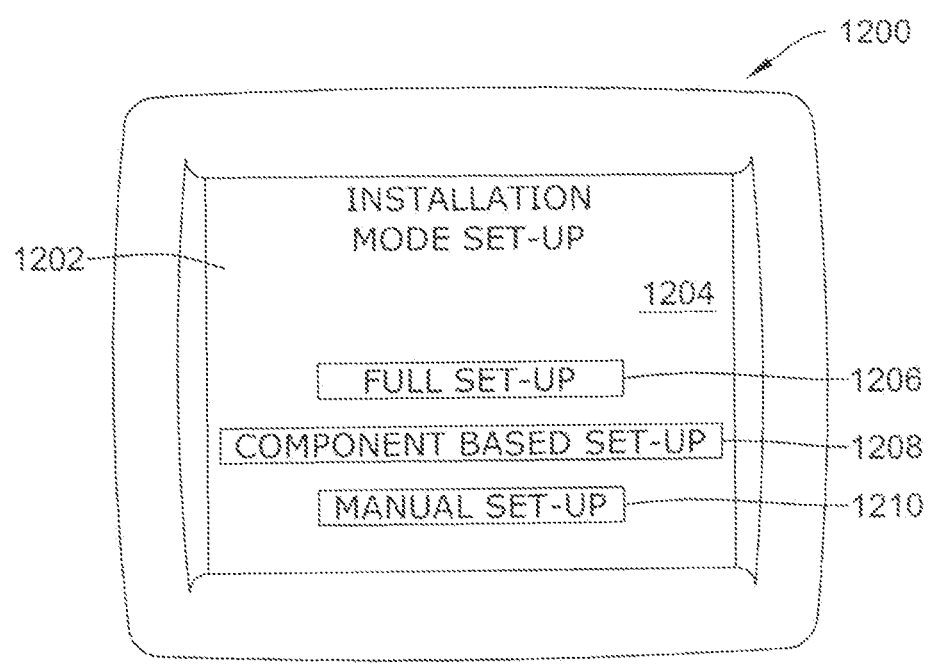
FIGS. 13A-13J are schematic drawings of an illustrative user interface showing an illustrative implementation of the flow diagram depicted in FIG. 12.

FIGS. 13A-13Z are schematic drawings of an illustrative HVAC touchscreen interface 1200 showing an illustrative implementation of the flow diagram depicted in FIG. 12. In a first view depicted in FIG. 13A, the interface 1200 can be configured to display a main installation menu screen 1202 on the display panel 1204, providing the installer with the choice of configuring one or more HVAC system components. The main installation menu screen 1202 can include, for example, a "FULL SET-UP" icon button 1206, a "COMPONENT BASED SET-UP" icon button 1208, and a "MANUAL SET-UP" icon button 1210.

The "FULL SET-UP" icon button 1206 can be selected on the display panel 1204 to permit the installer to fully configure the controller to work with the system components for the first time, or when the installer otherwise desires to cycle through each of the interview questions in sequence. The "COMPONENT BASED SET-UP" icon button 1208, in turn, can be selected to permit the installer to configure only certain system components or to configure the system in a different order than that normally provided by the interface 1200. The "MANUAL SET-UP" icon button 1210 can be selected to permit the installer to configure the controller manually using numeric or alphanumeric codes, if desired.

Figure 13B:
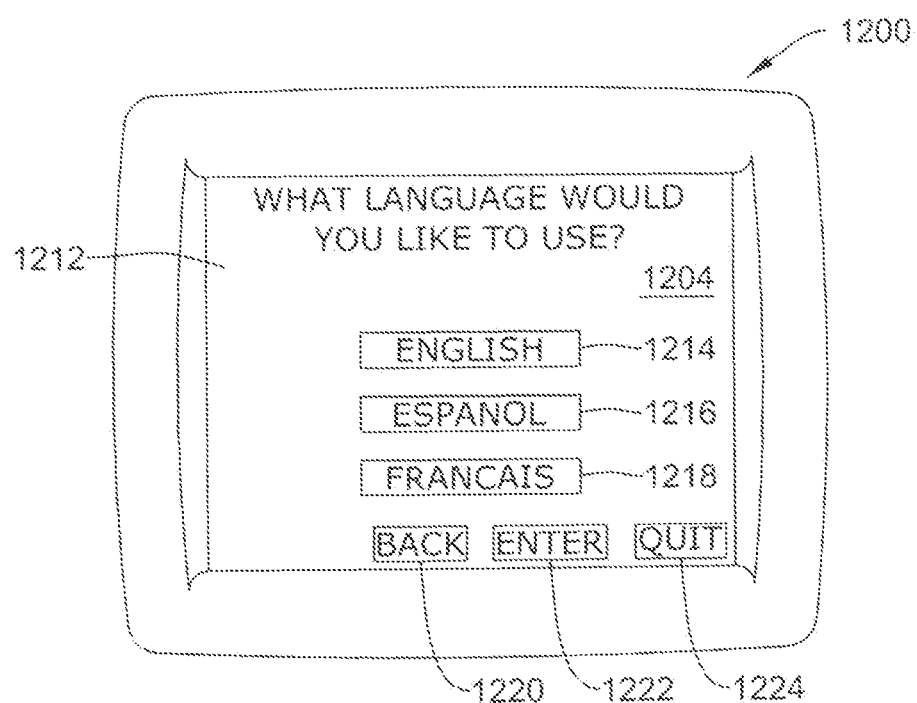

FIG. 13B is a schematic drawing showing the selection of the "FULL SET-UP" icon button 1206 on the main installation menu screen 1202 of FIG. 13A. As shown in FIG. 13B, the selection of icon button 1206 causes the interface 1200 to display a language setup screen 1212 that prompts the installer to select a desired language format for the remainder of the installation configuration. The interface 1200 can be configured to display, for example, an "ENGLISH" icon button 1214, an "ESPANOL" icon button 1216, and a "FRANCAIS" icon button 1218. Other language choices can also be displayed on the language setup screen 1212, if desired. A "BACK" icon button 1220 and "ENTER" icon button 1222 can be provided on the display panel 1204 to permit the installer to move back to the prior screen or to enter the current setting selected and move forward to the next question in the queue. A "QUIT" icon button 1224 can be provided on the display panel 1204 to permit the installer to quit the installation configuration mode, save any changes made, and then return the controller to normal operation.

Figure 13C:
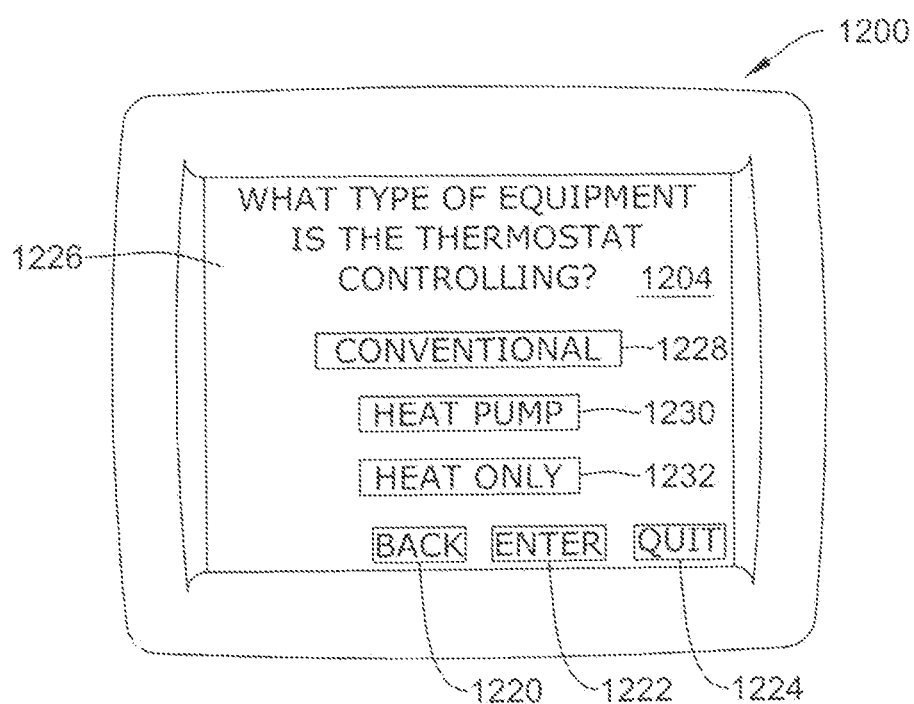

FIG. 13C is a schematic view showing the interface 1200 after the selection of the "ENGLISH" icon button 1214 on the language setup screen 1212 of FIG. 13B. As shown in FIG. 13C, once the installer has selected a desired language, the interface 1200 can be configured to display an equipment type screen 1226 allowing the installer to select the type of equipment to be configured. In some embodiments, for example, the equipment type screen 1226 may prompt the installer to select among a "CONVENTIONAL" icon button 1228, a "HEAT PUMP" icon button 1230, or a "HEAT ONLY" icon button 1232 each simultaneously displayed on the display panel 1204.

Figure 13D:
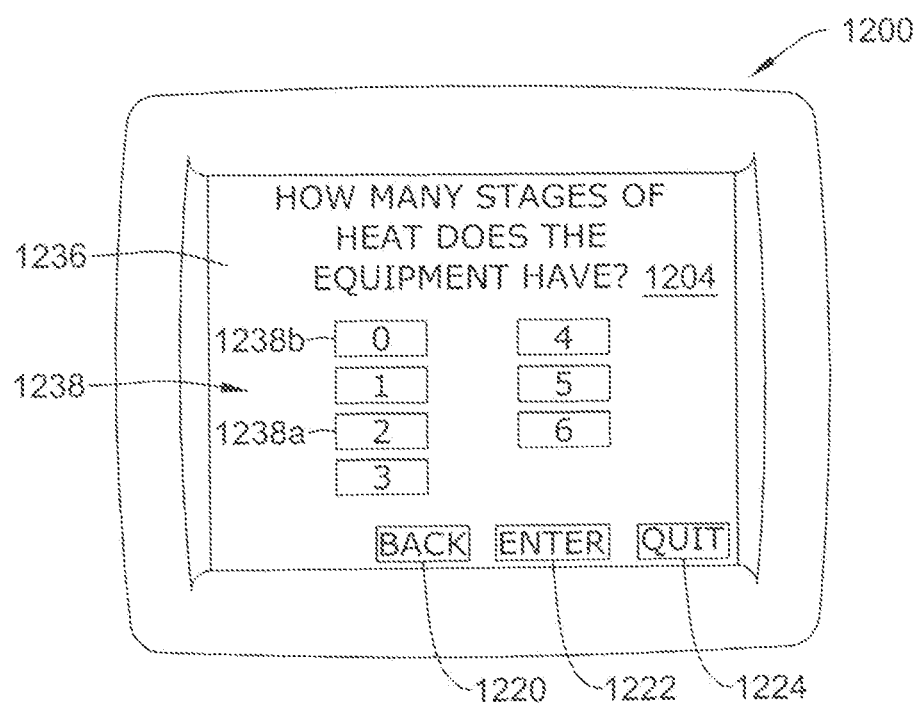

Once the installer has selected the desired equipment to be installed via the equipment type screen 1226, and as further shown in FIG. 13D, the interface 1200 can be configured to display a screen 1236 prompting the installer to select the number of heat stages to be configured, if any. Several numeric icon buttons 1238 can be provided on the screen 1236 to permit the installer to select the desired number of heat stages to be controlled. If, for example, the equipment to be configured has 2 stages of heating, the installer may select a "2" icon button 1238a on the screen 1236. Conversely, if the equipment to be configured has no heating stages, the installer may select a "0" icon button 238b on the display screen 1236, causing the interface 1200 to thereafter skip those interview questions pertaining to heating stages and cycles.

Figure 13E:
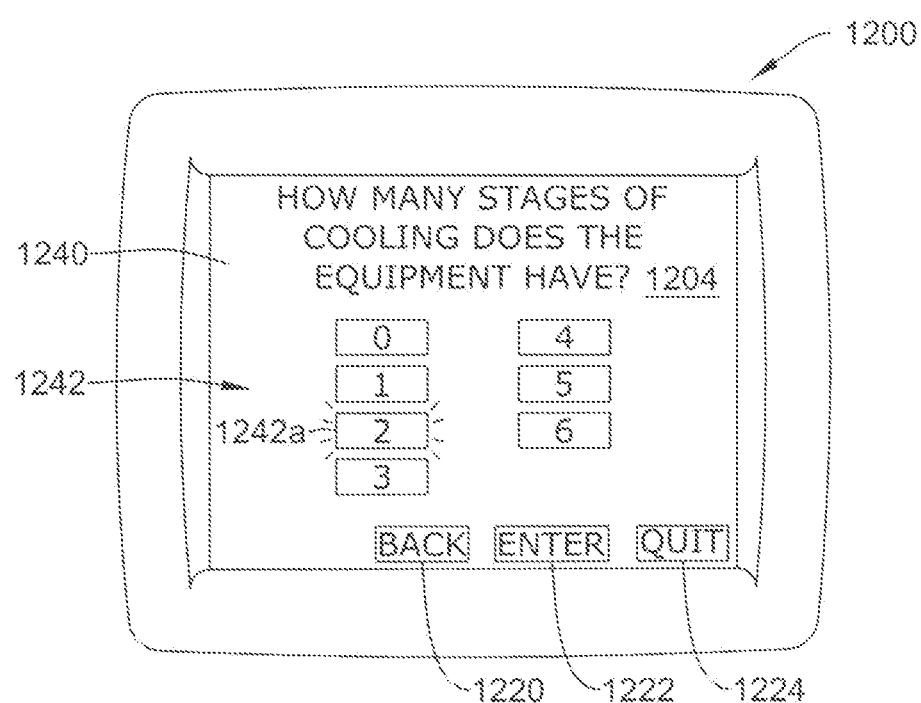

Once the number of heat stages has been configured via screen 1236, and as further shown in FIG. 13E, the interface 1200 can be configured to display another screen 1240 prompting the installer to select the number of cooling stages to be configured, if any. Several numeric icon buttons 1242 can be provided simultaneously on the screen 1240 to permit the installer to select the desired number of cooling stages. If, for example, the equipment to be configured has 2 stages of cooling, the installer may select a "2" icon button 1242a on the screen 1240. Depending on the response to the previous interview question on screen 1236 of FIG. 13D, the interface 1200 can be configured to default to a particular answer (e.g. "2") by blinking or flashing the answer on the screen 1240. In some cases, the interface 1240 may assume that the number of cooling stages is the same as the number of heating stages and skip screen 1240 altogether.

Figure 13F:
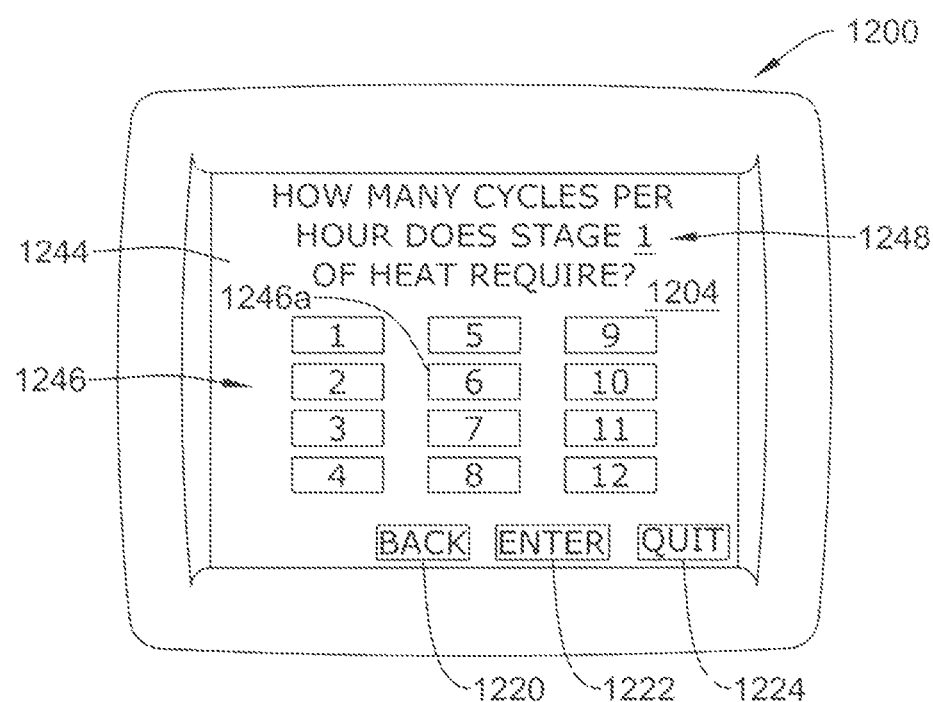
Figure 13G:
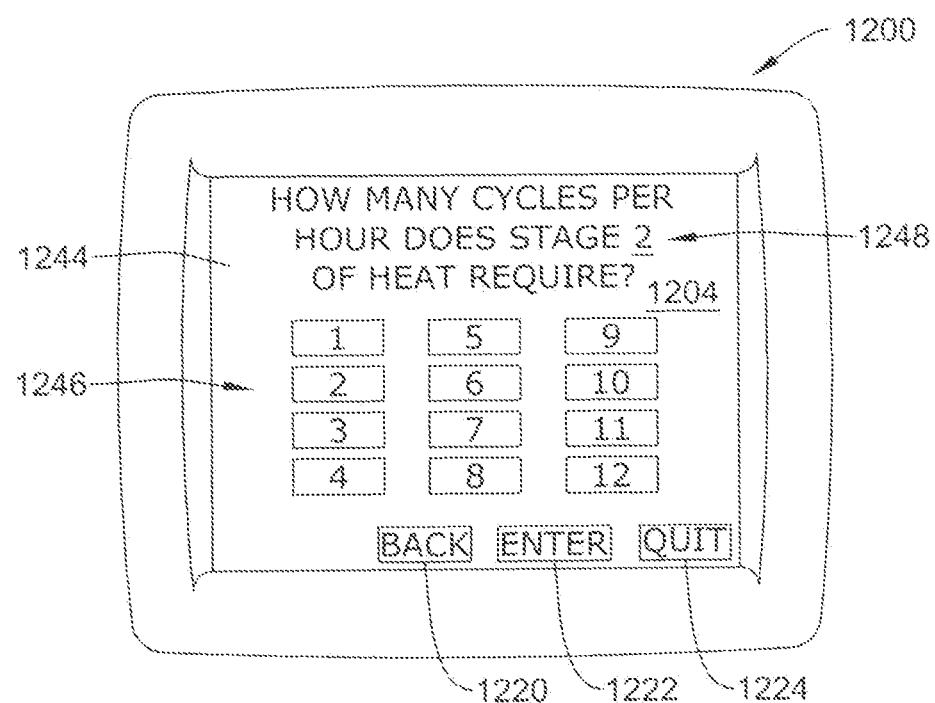

FIG. 13F is a schematic view showing the interface 1200 subsequent to the steps of configuring the heating and cooling stages in FIGS. 13D-13E. As shown in FIG. 13F, the interface 1200 can be configured to provide a screen 1244 initially prompting the installer to select a desired number of cycles per hour for the first stage of heating. Several numeric icon buttons 1246 can be provided simultaneously on the screen 1244 to permit the user to select the cycle rate at which the system operates for the particular stage number 1248 displayed on the screen 1244. For the first stage of heating for a two-stage system, for example, the installer may select the "6" icon button 1246a to operate the first heating stage for six cycles per each hour. Once a response is received for the first heating cycle, the interface 1200 may then prompt the installer to select the number of cycles for the second heating stage, as further shown in FIG. 13G. The process can be repeated one or more times depending on the number of heating stages to be configured.

Figure 13H:
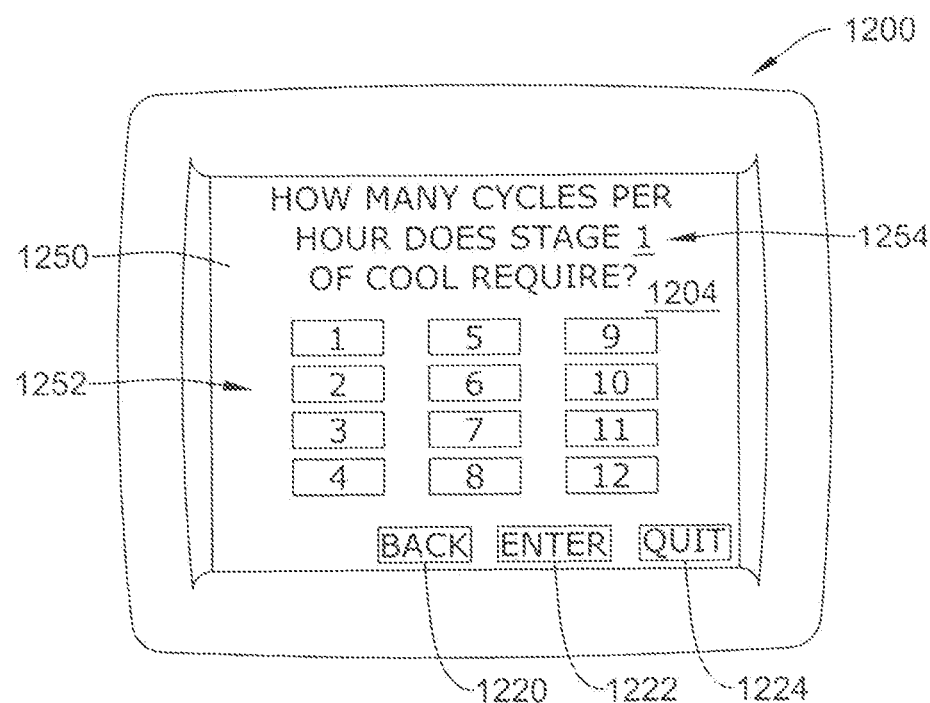

FIG. 13H is a schematic view showing the presentation of another screen 1250 on the interface 1200 for selecting the cycle rate for each cooling stage to be configured within the controller. Similar to the screen 1244 depicted in FIGS. 13F-13G, the screen 1250 may prompt the installer to initially select a desired number of cycles per hour for the first stage of cooling, and then repeat the interview process for each additional stage to be programmed, if any. Several numeric icon buttons 1252 can be provided simultaneously on the screen 1250 to permit the installer to select the cycle rate at which the system operates for the particular stage number 1254 displayed on the screen 1250. Once the installer has completed configuring each stage of heating and cooling, the interface 1200 can be configured jump to additional interview questions for any other components to be configured, or, alternatively, can exit the routine and return to normal operation using the newly programmed settings.

Figure 13I:
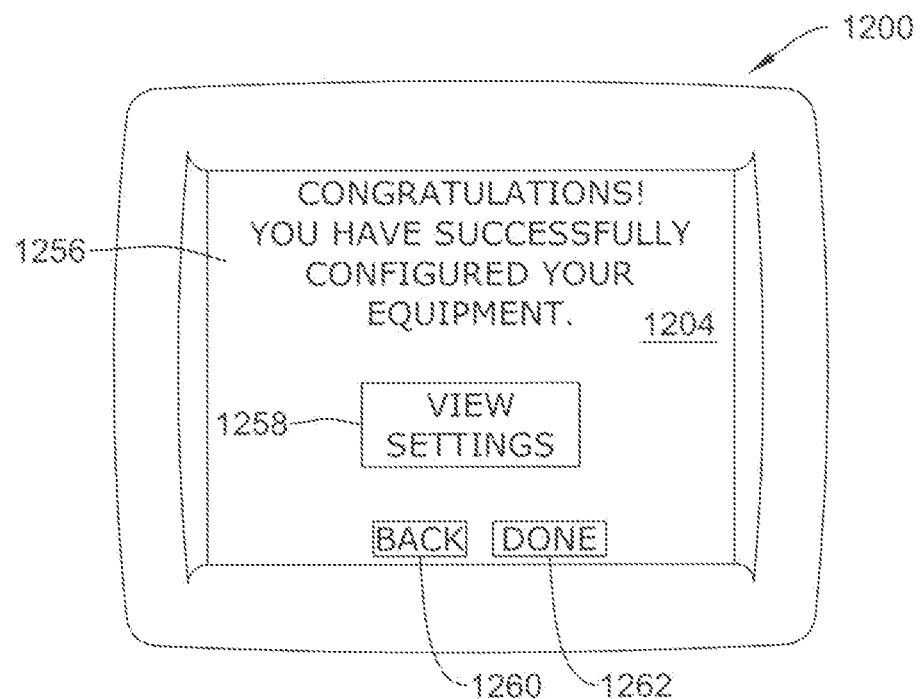

Once programming is complete, and as further shown in FIG. 13I, the interface 1200 can be configured to display a screen 1256 indicating that the configuration was successful along with a "VIEW SETTINGS" icon button 1258 allowing the installer to view the controller settings. A "BACK" icon button 1260 can be selected if the installer desires to go back and modify or change any settings. A "DONE" icon button 1262, in turn, can be selected by the installer to return the controller to normal operation.

Figure 13J:
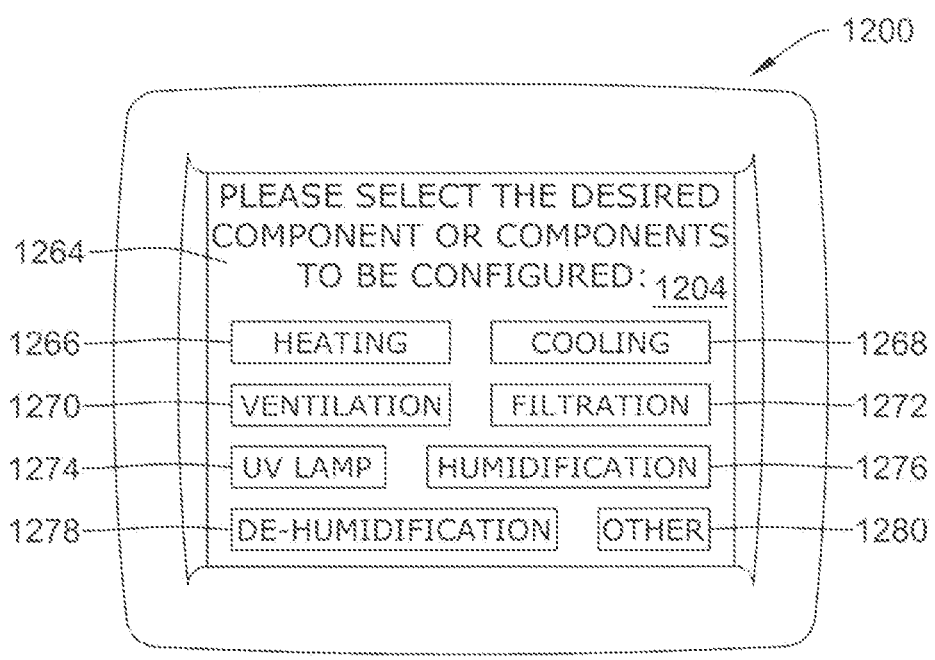

Referring back to FIG. 13A, if the installer desires to configure only selective components of the system, or prefers to enter configuration information in an order different than that generated by the interview question generator, the installer may select the "COMPONENT BASED SET-UP" icon button 1208 on the main installation menu screen 1202. When selected, the interface 1200 can be configured to display a component selection screen 1264, allowing the installer to select from among several different categories of equipment for configuration, as shown in FIG. 13J. The component selection screen 1264 can include, for example, a "HEATING" icon button 1266, a "COOLING" icon button 1268, a "VENTILATION" icon button 1270, a "FILTRATION" icon button 1272, a "UV LAMP" icon button 1274, a "HUMIDIFICATION" icon button 1276, and a "DEHUMIDIFICATION" icon button 1278. The icon buttons can correspond, for example, to the system components described above with respect to FIG. 9, although other combinations of system components are contemplated. An "OTHER" icon button 1280 provided on the screen 1264 can be selected by the installer to configure other system components such as any sensors or other connected controllers, if desired.

The selection of the icon buttons on the component selection screen 1264 causes the interface 1200 to display one or more interview questions and answers on the display panel 1204 based on the type of equipment to be configured. If, for example, the installer desires to configure only the heating and cooling system components, the installer may select both the "HEATING" icon button 1266 and "COOLING" icon button 1268 on the screen 1264, causing the user interface 1200 to present only those interview questions that pertain to heating and cooling control. The process of providing the installer interview questions and answers in multiple-choice format can then be performed in a manner similar to that described above with respect to FIGS. 13C-13H. If desired, the process can be performed for any other system component or components to be configured.

The present invention should not be considered limited to the particular examples described above, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

What is claimed is:

1. A thermostat for controlling one or more HVAC components of an HVAC system, the thermostat comprising:
   a housing;
   a user interface housed by the housing, user interface including a touch screen display;
   a temperature sensor housed by the housing;
   a memory for storing configuration information, the memory housed by the housing; and
   a controller operative coupled to the memory, the temperature sensor, the touch screen display, the controller housed by the housing and programming to:
      provide a guided programming sequence of two or more screens on the touch screen display of the thermostat from a first screen to a last screen, the particular sequence of two or more screens is determined by the controller, at least two of the two more screens prompting a user to provide configuration information that is related to one or more HVAC components of the HVAC system that is to be controlled by the thermostat,
         wherein one of the two more screens prompting the user to provide configuration information that is used to identify whether the HVAC system has a conventional heating unit, and includes two or more selectable icons concurrently displayed on the touch screen display with each of the two or more selectable icons displayed as a separate touch button, wherein each touch button includes a descriptive indicator of the corresponding selectable icon displayed inside an outer perimeter of the touch button;
         wherein another one of the two more screens is a configuration screen that prompts the user to provide further configuration information, the configuration screen includes two or more touch buttons concurrently displayed on the touch screen display with each of the selectable touch buttons having a descriptive indicator displayed inside a perimeter of the corresponding touch button;
      accept user selections via the two more screens;
      determine updated configuration information based at least in part on the accepted user selections, the updated configuration information including whether the HVAC system has a conventional heating unit and if so an updated number of heating stages of the conventional heating unit;
      provide a summary screen that displays a summary of the configuration information; and
      use the updated configuration information when subsequently controlling the HVAC system.

2. The thermostat of claim 1, wherein one of the two or more screens comprises a touch button, that when selected, indicates two heating stages.

3. The thermostat of claim 1, wherein one of the two or more screens comprises a touch button, that when selected, indicates two cooling stages.

4. The thermostat of claim 1, wherein the user interface further comprises a speaker.

5. A thermostat for controlling one or more HVAC components of an HVAC system, the thermostat comprising:
a housing;
a user interface housed by the housing, user interface including a touch screen display;
a temperature sensor housed by the housing;
a memory for storing configuration information, the memory housed by the housing; and
a controller operative coupled to the memory, the temperature sensor, the touch screen display, the controller housed by the housing and programming to:
provide a guided programming sequence of two or more screens on the touch screen display of the thermostat from a first screen to a last screen, the particular sequence of two or more screens is determined by the controller, at least two of the two more screens prompting a user to provide configuration information via one or more user selections that is related to one or more HVAC components of the HVAC system that is to be controlled by the thermostat, wherein one of the two more screens prompting the user to provide configuration information that is used to determine whether the HVAC system has a conventional heating unit, and includes two or more selectable icons concurrently displayed on the touch screen display with each of the two or more selectable icons displayed as a separate touch button, wherein each touch button includes a descriptive indicator of the corresponding selectable icon displayed inside an outer perimeter of the touch button;
accept user responses via the two or more screens;
determine updated configuration information based at least in part on the accepted user responses including whether the HVAC system has a conventional heating unit and if so an updated number of heating stages of the conventional heating unit;
update configuration information in the memory based, at least in part, on the accepted user responses;
provide a summary screen that displays a summary of the configuration information including the updated configuration information, wherein the summary screen is one of the two or more screens of the guided programming sequence; and
use the updated configuration information when subsequently controlling the HVAC system.

6. The thermostat of claim 5, wherein a message is displayed that directs the user to select one of the selectable icons.

7. The thermostat of claim 5, wherein at least one of the two or more selectable icons corresponds to a heat pump.

8. The thermostat of claim 5, wherein the controller is programmed to determine a number of heating stages of the conventional heating unit based at least in part on a user selection of one or more selectable touch button on one of the two or more screens.

9. The thermostat of claim 8, further comprising a touch button, that when selected, indicates two heating stages.

10. The thermostat of claim 5, wherein the controller is programmed to determine a number of cooling stages of the HVAC system based at least in part on a user selection of one or more selectable touch button on one of the two or more screens.

11. The thermostat of claim 10, further comprising a touch button, that when selected, indicates two cooling stages.

12. The thermostat of claim 5, wherein at least one of the two or more screens concurrently displays on the touch screen display a first touch button that if selected exits the guided programming sequence of two or more screens and a second touch button that if selected displays a previous screen of the two or more screens in the guided programming sequence of two or more screens.

13. The thermostat of claim 5, wherein the user interface further comprises a speaker.

14. A thermostat for controlling one or more HVAC components of an HVAC system, the thermostat comprising:
a housing;
a user interface housed by the housing, user interface including a touch screen display;
a temperature sensor housed by the housing;
a memory for storing configuration information, the memory housed by the housing; and
a controller operative coupled to the memory, the temperature sensor, the touch screen display, the controller housed by the housing and programming to:
provide a guided programming sequence of two or more screens on the touch screen display of the thermostat from a first screen to a last screen, the particular sequence of two or more screens is determined by the controller, at least two of the two more screens prompting a user to provide configuration information via one or more user selections that is related to one or more HVAC components of the HVAC system that is to be controlled by the thermostat, wherein at least one of the screens that prompt the user to provide configuration information includes two or more selectable touch buttons concurrently displayed on the touch screen display with each of the selectable touch buttons having a descriptive indicator displayed inside a perimeter of the corresponding touch button;
accept user responses via the two or more screens;
determine whether the HVAC system has a conventional heating unit based at least in part on a user selection of one or more of the selectable touch buttons;
determine an updated number of heating stages, an updated number of cooling stages based at least in part on the user responses accepted via the two or more screens;
updating configuration information in the memory including the updated number of heating stages, the updated number of cooling stages and/or whether the HVAC system has a conventional heating unit;
provide a summary screen that displays a summary of the configuration information; and
use the updated configuration information when subsequently controlling the HVAC system.

15. The thermostat of claim 14, wherein one of the two or more screens comprises a touch button, that when selected, indicates two heating stages.

16. The thermostat of claim 14, wherein one of the two or more screens comprises a touch button, that when selected, indicates two cooling stages.

17. The thermostat of claim 14, wherein the controller is configured to determine the number of heating stages based at least in part on a user selection of one or more of the selectable touch buttons.

18. The thermostat of claim 14, wherein the controller is configured to determine the number of cooling stages based at least in part on a user selection of one or more of the selectable touch buttons.

19. The thermostat of claim 14, wherein the controller is configured to determine a cycles per hour configuration parameter based at least in part on a user selection of one or more of the selectable touch buttons.

20. The thermostat of claim 19, wherein the cycles per hour configuration parameter corresponds to a first stage of a conventional heating unit.

21. The thermostat of claim 14, wherein at least one of the two or more selectable touch buttons indicates that the HVAC system has the conventional heating unit and another one of the two or more selectable buttons indicates that the HVAC system has a heat pump.

22. The thermostat of claim 14, wherein the summary screen is one of the two or more screens of the guided programming sequence.

23. The thermostat of claim 14, wherein the user interface further comprises a speaker.

* * * * *